(12) United States Patent
von Wolske

(10) Patent No.: US 9,387,915 B2
(45) Date of Patent: Jul. 12, 2016

(54) QUICK CHANGE BEARING HOLDER APPARATUS FOR A ROTATING SHAFT

(71) Applicant: James P. von Wolske, Austin, TX (US)

(72) Inventor: James P. von Wolske, Austin, TX (US)

(*) Notice: Subject to any disclaimer, the term of this patent is extended or adjusted under 35 U.S.C. 154(b) by 183 days.

(21) Appl. No.: 14/047,194

(22) Filed: Oct. 7, 2013

(65) Prior Publication Data

US 2014/0037237 A1     Feb. 6, 2014

Related U.S. Application Data

(63) Continuation of application No. 12/565,041, filed on Sep. 23, 2009, now Pat. No. 8,550,863.

(60) Provisional application No. 61/099,820, filed on Sep. 24, 2008.

(51) Int. Cl.
| | |
|---|---|
| F16C 19/00 | (2006.01) |
| B63H 23/32 | (2006.01) |
| B63H 23/34 | (2006.01) |
| F16C 35/02 | (2006.01) |
| F16C 35/067 | (2006.01) |
| F16D 3/38 | (2006.01) |
| F16D 3/42 | (2006.01) |
| F16C 17/04 | (2006.01) |
| F16C 32/06 | (2006.01) |
| F16C 41/00 | (2006.01) |

(52) U.S. Cl.
CPC .............. *B63H 23/321* (2013.01); *B63H 23/34* (2013.01); *F16C 17/045* (2013.01); *F16C 32/0629* (2013.01); *F16C 35/02* (2013.01); *F16C 35/067* (2013.01); *F16C 41/004* (2013.01); *F16D 3/38* (2013.01); *F16D 3/42* (2013.01); *B63H 2023/325* (2013.01)

(58) Field of Classification Search
CPC ........ F16C 35/02; F16C 35/06; F16C 35/067; F16C 35/07; F16C 35/077; F16C 41/004; F16C 2326/30; B63H 23/34; B63H 23/321; B63H 2023/322; B63H 2023/323; B63H 2023/325; B63H 2023/326; F16D 3/38; F16D 3/42; F16D 3/43
USPC ......... 384/397, 440, 441, 462, 535, 537, 538, 384/581, 584
See application file for complete search history.

(56) References Cited

U.S. PATENT DOCUMENTS

| | | | |
|---|---|---|---|
| 2,605,148 | A * | 7/1952 | Shoup .......................... 384/563 |
| 3,871,325 | A | 3/1975 | Raulerson |
| 4,083,610 | A | 4/1978 | Kruchowski |
| 4,558,869 | A | 12/1985 | Grove et al. |
| 4,565,532 | A | 1/1986 | Connor |

(Continued)

*Primary Examiner* — James Pilkington
(74) *Attorney, Agent, or Firm* — Gary Stanford; Huffman Law Group, PC

(57) ABSTRACT

A quick change bearing holder apparatus for a rotating shaft including a shaft housing, a conical bearing holder and a bearing retainer element. The shaft housing has a conical socket. The conical bearing holder has an outer conical surface compatible with the conical socket of the shaft housing. The bearing retainer element mounts to the shaft housing to urge the bearing holder into the conical socket of the shaft housing. Lubrication feed lines and openings and drain lines and openings may be included in the shaft housing and conical bearing holder. Lubrication may further be facilitated using circumferential grooves in the shaft housing or the conical bearing holder. The outer conical surface of the conical bearing holder may have a taper angle that forms a self ejecting taper.

22 Claims, 17 Drawing Sheets

(56) References Cited

U.S. PATENT DOCUMENTS

| | | | |
|---|---|---|---|
| 4,721,441 A * | 1/1988 | Miyashita et al. | 384/518 |
| 4,775,342 A | 10/1988 | Connor et al. | |
| 4,789,253 A * | 12/1988 | Perego | 384/517 |
| 4,971,457 A * | 11/1990 | Carlson | 384/99 |
| 6,383,043 B1 | 5/2002 | Heston | |
| 6,878,068 B2 | 4/2005 | Bigelow et al. | |
| 6,899,630 B2 | 5/2005 | Fisher et al. | |
| 7,354,348 B2 | 4/2008 | Kapustin et al. | |

* cited by examiner

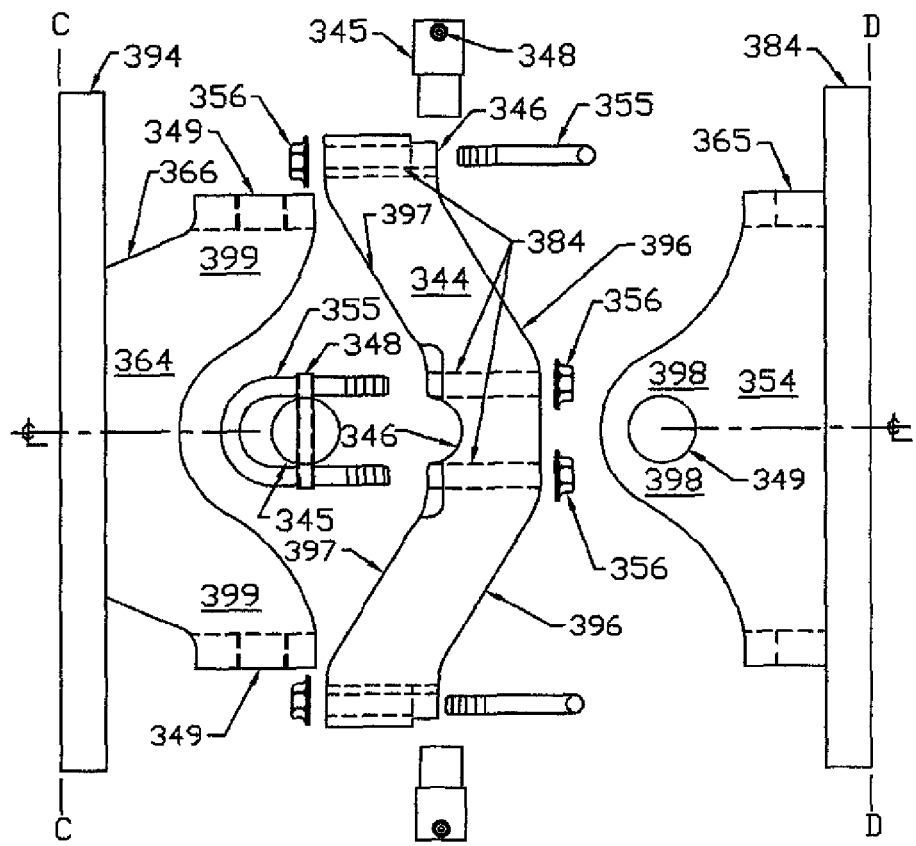
Fig. 1
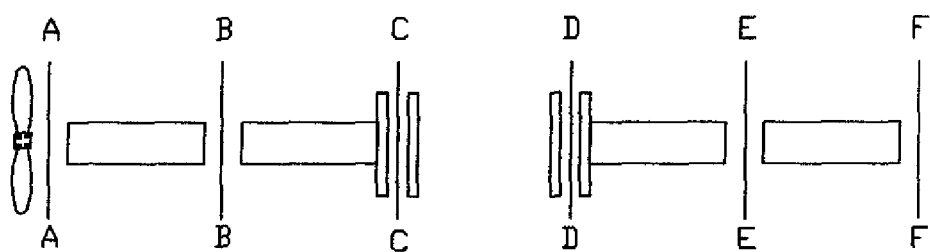
Fig. 7  Fig. 6  Fig. 1  Fig. 4  Fig. 5
              Fig. 3
              Fig. 8
Fig. 2

QUICK CHANGE BEARING HOLDER APPARATUS FOR A ROTATING SHAFT

CROSS-REFERENCE TO RELATED APPLICATIONS

The present application is a continuation of U.S. application Ser. No. 12/565,041 entitled "WATERCRAFT PROPELLER PROPULSION SYSTEM HAVING A GIMBAL ASSEMBLY WITH AN EXTERNAL GIMBAL RING" by same inventor, now pending and issuing 1010812013 as U.S. Pat. No. 8,550,863, which itself claims the benefit of U.S. Provisional Application Ser. No. 61/099,820, filed on Sep. 24, 2008, which are both herein incorporated by reference for all intents and purposes.

BACKGROUND OF THE INVENTION

1. Field of the Invention

The present invention relates to watercraft, and more particularly to a quick change bearing holder apparatus for a rotating shaft.

2. Description of the Related Art

Various types of propulsion systems are known for watercraft. The present disclosure relates to screw propeller propulsion units that mount to a transom of a boat and are often referred to as "surface piercing drives" or "surface drives." Surface drive propeller propulsion systems are typically provided on boats which operate at high speed and usually have a partially submerged propeller with at least one degree of articulation for tilt or steering adjustment. Conventional surface drive propulsion systems for boats commonly have a rotating propeller shaft coupled via a rotating Universal joint (U-joint) to the drive shaft of a boat motor or engine. The drive shaft, propeller shaft and Universal joint are housed within a non-rotating housing with an articulation joint that allows the drive system to have at least one degree of articulation for tilt or steering adjustment. Various types of articulation joints are known, such as a gimbal. Some conventional configurations do not use a gimbal, but rather use a ball or hollow sphere fitted into a hemispherical seat. The present disclosure, however, is directed towards a gimbal or gimbal assembly.

It is noted that the gimbal, although similar in appearance to a Universal joint, has entirely different function, stress analysis, and design constraints such that it warrants a different art classification. A Universal joint is a device used to transmit rotary power in the form of torque from a first rotating shaft to a second rotating shaft at a high rate of speed in which one shaft is allowed to move through various angular deflections relative to the other shaft. A gimbal, on the other hand, is a non-rotating device that is often used to house a Universal joint contained within to provide a guide to the Universal joint and to transmit axial load as common with conventional propeller propulsion systems.

A gimbal assembly includes three main components including a first gimbal end, a gimbal ring, and a second gimbal end. The first gimbal end is hingedly connected to the gimbal ring by a pair of gimbal pins to allow articulation about a first axis. The second gimbal end is also connected to the gimbal ring by a second pair of gimbal pins to allow articulation about a second axis. One conventional gimbal assembly includes a gimbal ring that is internal to one gimbal end and that is external to the other gimbal end. Another configuration includes a gimbal ring that is internal to both gimbal ends. Conventional propulsion units use standard rolling element bearings pressed onto the propeller shaft and bolted into the propeller shaft housing and are difficult to access and remove and/or replace. Conventional drive systems do not have a means to measure propeller thrust forces.

BRIEF DESCRIPTION OF THE DRAWINGS

The benefits, features, and advantages of the present invention will become better understood with regard to the following description, and accompanying drawings, in which:

FIG. 1 is an exploded view of the components between Match Line C-C and Match Line D-D of FIG. 2, depicting a gimbal assembly including a first gimbal end, a gimbal ring, and a second gimbal end.

FIG. 2 is a simplified and exploded view of the sequential relationship of adjacent elements of a watercraft propeller propulsion system having an articulation joint configured as a gimbal assembly with an external gimbal ring according to an exemplary embodiment as further detailed in remaining FIGS. 1, 3 and 37.

DETAILED DESCRIPTION

Figure 3:
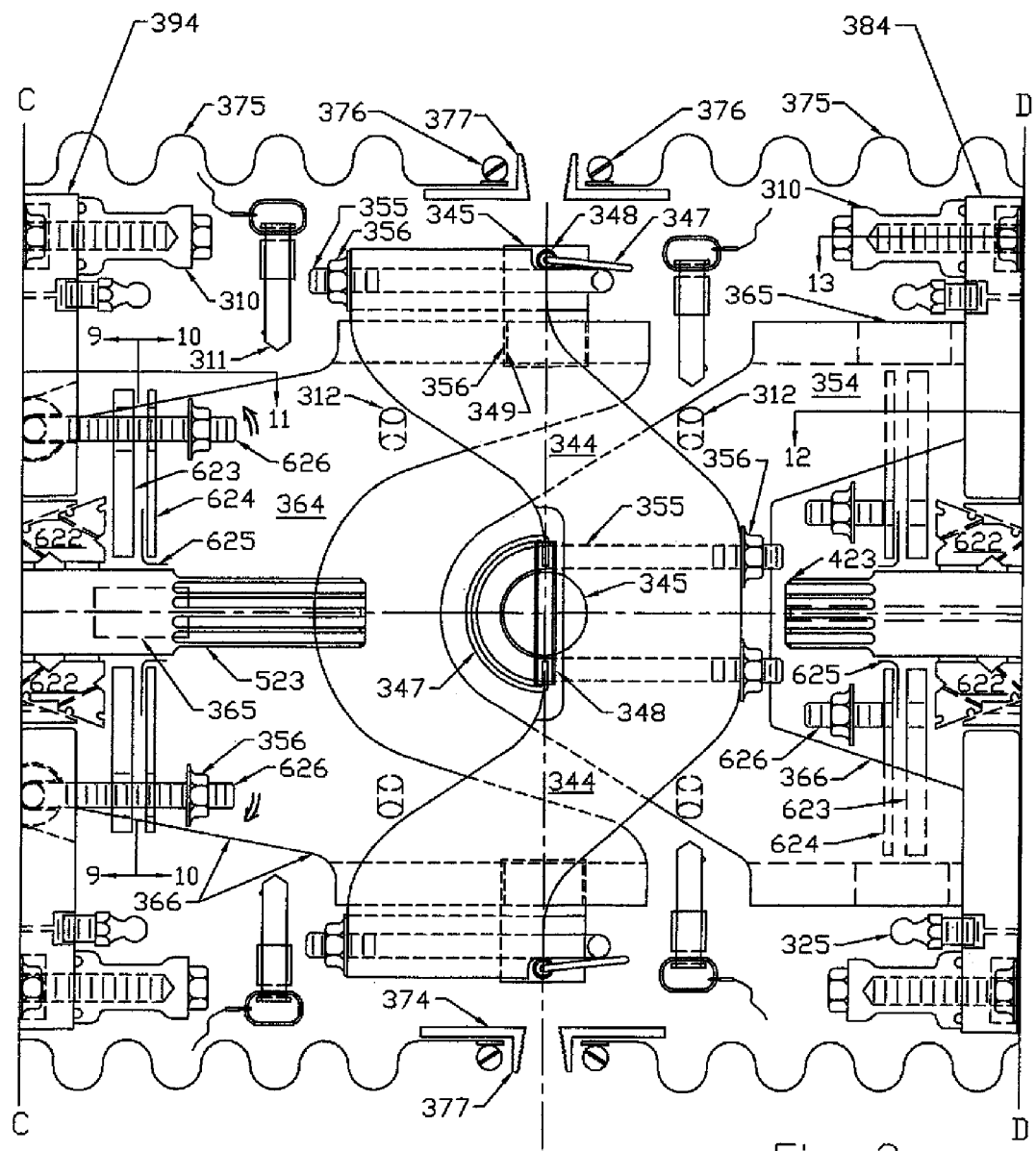
FIG. 3 is a phantom drawing of the gimbal assembly and shows a zigzag shaped gimbal ring in the center.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A watercraft propeller propulsion system as described herein is significantly more user friendly than conventional watercraft propeller propulsion systems. One embodiment relates to the construction of a gimbal assembly that connects the propeller shaft housing to the drive shaft housing that is connected to the boat. One embodiment relates to the quick-change journal bearing holders to support the propeller shaft. One embodiment relates to a thrust bearing assembly that is also used to measure propeller thrust forces. One embodiment relates to a bearing assembly with a lubricant impelling system and method.

The various embodiments provide any of one or more benefits as described herein. One benefit is that the propulsion unit may be designed to be more accessible for ease of maintenance of internal parts, and can be serviced with simpler tools. Another benefit is that the gimbal assembly uses an external gimbal ring, which permits ease of maintenance to the Universal joint located within, while still maintaining compact overall assembly dimensions. Another benefit is that the gimbal ring is designed in a zigzag configuration to permit the gimbal pins to be easily removable and installable. In one embodiment, for example, gimbal pins are clamped to the external gimbal ring using U bolts and corresponding nuts which are more easily accessible and removable with a single wrench. For example, the U bolt nuts may be loosened and tightened without a backup wrench. Also, the U bolt avoids a blind or threaded hole in the gimbal ring as is common for conventional gimbal assemblies. A zigzag shaped configuration allows the most compact gimbal ring because the clearance between the gimbal ring and the gimbal ends can be minimized since the area where the gimbal ring overlaps the gimbal end is at the same area where the two parts swivel parallel to each other. A compact gimbal ring has a smaller diameter than a conventional gimbal ring which allows the propeller shaft and drive shaft to be located as low as possible at the transom of a boat. Such configuration enables the propeller thrust vector to have a minimum vertical component, so that the thrust vector is more parallel to the direction of travel of the boat as compared to conventional gimbal assemblies which are larger and less compact. Furthermore, in conventional gimbal assembly configurations, a bellows is mounted around the Universal joint inside the larger conventional gimbal assembly to minimize exposure of the Universal joint to water, sand and other contaminants. A gimbal assembly with an external gimbal ring facilitates a more compact configuration so that the bellows may be mounted outside of the external gimbal ring. This enables quick change of the bellows without disassembly of the gimbal.

Another benefit is that the bearings that support the rotating shaft may be held in tapered holders for quick change from the stationary housing. This quick-change can be done by using simple hand tools. Another benefit is that the bearings may be configured with positive oil feed from a pressurized source for circulating cooled and filtered oil through the bearings. Another benefit is that the thrust load from the propeller may be constrained and transferred to the propeller shaft housing by a hydraulic or hydrostatic bearing that uses a pressurized oil source to levitate the thrust ring of the propeller shaft on a contained reservoir of oil to allow the frictional forces to be minimized. Another benefit is that the hydrostatic thrust bearing may be used as part of a remotely readable measure of the amount of thrust pushing the boat through the water at any given operating condition or speed. Alternately, the hydrostatic thrust bearing can be locked against rotation and used as a non-rotating load cell used for measuring axial load forces. Another benefit is to provide bearing assembly with an oil impelling means to circulate oil lubricant.

Figure 37:
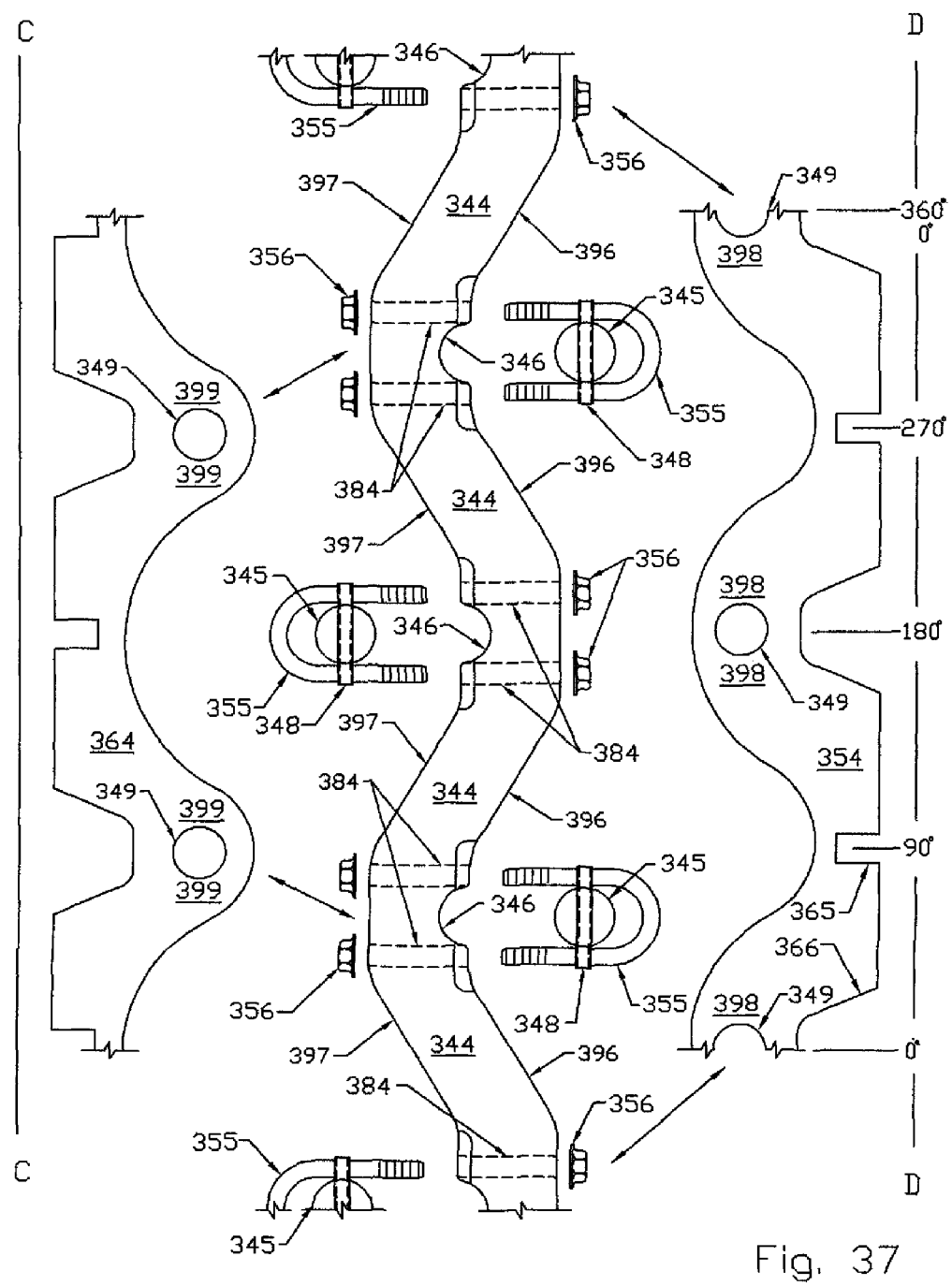
FIG. 37 is a 360 degree view of the gimbal assembly of FIG. 1 showing the cylindrical parts as though they were cut open and unwrapped to lay flat on a sheet of paper to illustrate the construction of the parts.

FIG. 2 is a simplified and exploded view of the sequential relationship of adjacent elements of a watercraft propeller propulsion system having an articulation joint configured as a gimbal assembly with an external gimbal ring according to an exemplary embodiment as further detailed in remaining FIGS. 1, 3 and 37. FIG. 2 is a guide to the spatial relationship of adjacent elements of the total assembly, in which the propeller is shown on the left, the gimbal assembly is shown in the middle as a blank space, and the power input end is shown on the right and connects to a motor (not shown). Each figure includes Match Lines that delineate the sequential element from its neighboring element as the viewer goes from one end of the boat propulsion unit to the opposite end of the boat propulsion unit. The sequence of elements is shown in FIG. 2 and shows the propeller on the left end of the figure near Match Line A-A, and shows the power input end at the right end of the figure near Match Line F-F. The two sections located on the left side between Match Line A-A and Match Line C-C depict the propeller shaft end of the system. The two sections located on the right side between Match Line D-D and Match Line F-F depict the drive shaft end of the system. The motor for the boat is connected at Match Line F-F. Match Lines may not have any structural meaning and may simply represent a convenient point on a larger detailed drawing where the components seem to end, but it is simply for convenience and clarity that the Match Lines are shown at the locations selected. The concept of an "exploded view" is used to depict the individual elements in relation to the adjacent elements and is commonly used in machine design and assembly drawing. The forward end of the boat propulsion unit is towards Match Line F-F where the motor is located, and the rearward end of the boat propulsion unit is towards Match Line A-A where the propeller is located.

FIG. 1 is an exploded view of the components between Match Line C-C and Match Line D-D of FIG. 2 and depicts a gimbal assembly including a first generally cylindrical gimbal end, a gimbal ring, and a second generally cylindrical gimbal end. This assembly allows the propeller shaft housing located to the left of Match Line C-C to articulate relative to the drive shaft housing located to the right of Match Line D-D. The gimbal assembly is a non-rotating assembly that goes over the rotating Universal joint contained within, but not shown in this figure. Refer also to FIG. 3 and FIG. 37.

The gimbal assembly has a novel arrangement of a gimbal ring 344 that is located externally to both gimbal ends. Gimbal assemblies are usually constructed from two end elements referred hereinafter as gimbal ends, plus a gimbal ring, and two pairs of gimbal pins. Conventional gimbal assemblies are constructed with the gimbal ring fitting in the radial space between the two gimbal ends. That is to say, in a conventional configuration, the gimbal ring is located both radially internal of one gimbal end and radially external of the other gimbal end, so that it is not an external gimbal ring. The gimbal ring 344 described herein is external since it is located radially external of both the first gimbal end 354 and located radially external of the second gimbal end 364. Thus, the gimbal assembly includes a first gimbal end 354, and a gimbal ring 344, and a second gimbal end 364, wherein said gimbal ring is located radially external to both the first gimbal end and located radially external to the second gimbal end.

FIG. 1 also shows another novel aspect in which the gimbal ring 344 is offset in a zigzag fashion such that the four individual gimbal pins 345 are located near the longitudinal faces of the gimbal ring wherein the adjacent gimbal pins, that are located 90 degrees away from each other, are near opposite longitudinal end faces, a first end face 396, and a second end face 397, of the gimbal ring, yet are aligned to be located on a single transverse plane. The plane of the gimbal pins is oriented to be transverse and perpendicular to the longitudinal axis of the gimbal assembly. External gimbal ring 344 is a generally cylindrical element and has ends that resemble a zigzag shape. The zigzag is intentional to allow the gimbal pins 345 to be mounted to the alternate faces of the gimbal ring at corresponding recesses 346 and secured with U-bolts 355 and nuts 356. This is a face loaded gimbal ring. That is to say, in one embodiment the gimbal assembly includes a gimbal ring 344 in which the gimbal ring is generally cylindrical and has two pairs of gimbal pins 345 such that a first pair of gimbal pins are located diametrically opposite of each other on the gimbal ring, so that a second pair of gimbal pins are located diametrically opposite of each other on the same gimbal ring, and so that the first pair of gimbal pins form a first line and the second pair of gimbal pins from a second line and wherein the first line and second line intersect and form a plane in which the plane is generally transverse to the longitudinal axis of the gimbal ring, and in which the first pair of gimbal pins is located at a first longitudinal end face of the gimbal ring and the second pair of gimbal pins is located at a second longitudinal end face of the gimbal ring. The shape of the gimbal ring according to one embodiment is further explained in FIG. 37.

A first advantage to this zigzag ring configuration is that the gimbal pins can be placed in a common transverse plane relative to the centerline of the propulsion unit and the gimbal ring diameter can be minimized. This reduced diameter is possible because each transverse axis of the gimbal ring pivots about each opposite pair of gimbal pins 345 on opposite sides of a first gimbal end 354 and on opposite sides of a second gimbal end 364, in closer clearance than would be possible with a gimbal ring that was symmetric about the common transverse plane of the gimbal pins. Thus, this is a space saving feature to allow a more compact overall diameter of the gimbal assembly. This is desirable in this application on boats because it is desirable to minimize the overall diameter of the gimbal assembly.

A second advantage to the zigzag configuration is that the radial clearance between the gimbal ring 344 and a gimbal end 354 is minimized to therefore minimize the bending moments on the gimbal pins 345 and also minimize the internal torsional stresses generated in the gimbal ring.

Figure 8:
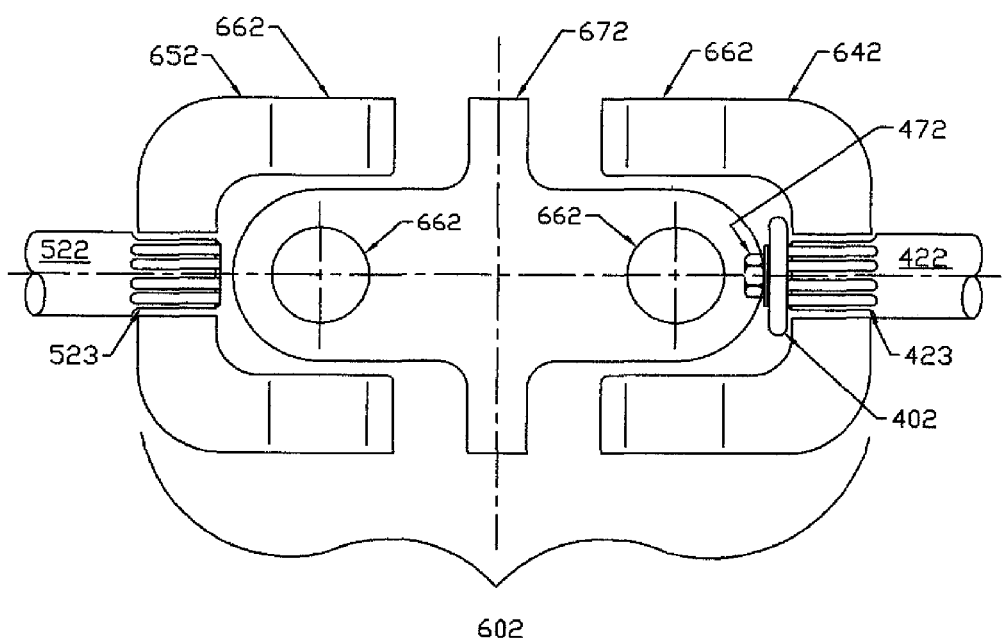
FIG. 8 is a simplified drawing of a conventional Universal joint that couples a drive shaft as shown on the right to a propeller shaft as shown on the left.

A third advantage to this zigzag shaped gimbal ring 344 is that the gimbal pins 345 can be secured to the faces of the gimbal ring with U-bolts 355 and nuts 356 to facilitate the ease of removal and replacement of the gimbal pins. The U-bolts and nuts are simply loosened and the gimbal pins are pulled out or reinserted to allow disassembly and reassembly of the gimbal assembly. Gimbal cross pins 348 prevent inserting the gimbal pins 345 too deeply into the grip of the U bolts 355. This disassembly and reassembly of the gimbal unit is beneficial to gain access for removal and replacement of the rotating Universal joint 602 that is located inside the gimbal assembly. An exemplary Universal joint is shown in FIG. 8.

The term zigzag is used to figuratively describe the shape of the end faces of the gimbal ring 344 as can be seen clearly in FIG. 37. The end faces are undulated along the axis of the gimbal assembly and have two high and two low areas on each end face of the gimbal ring and are phased such that the general length of the gimbal ring is relatively uniform. Each end face of the gimbal ring is undulated with two highs and two lows per side.

The first gimbal end 354 is generally a cylinder shape and has two axial extensions commonly referred in the industry as first end yoke 398 that includes a pair of gimbal pin holes 349 to receive gimbal pins 345. Similarly, the second gimbal end 364 is generally a cylinder shape and has two axial extensions common in the industry shown as second end yoke 399 that includes a pair of gimbal pin holes 349 to receive gimbal pins 345. This arrangement is further explained in FIG. 37.

FIG. 3 is a phantom drawing of the gimbal assembly and shows a zigzag shaped gimbal ring 344 in the center and includes the gimbal pins 345. In one embodiment, the gimbal ring appears as a zig-zag shaped cylinder. The figure also shows the corrugated bellows 375 on the outside to seal out water. The splined shaft 523 shown on the left is the input end of the propeller shaft and the splined shaft 423 shown on the right is the connecting end of the drive shaft. Not shown in this view is a rotating Universal joint that connects the spline of the rotating drive shaft to the spline of the rotating propeller shaft.

Figure 35:
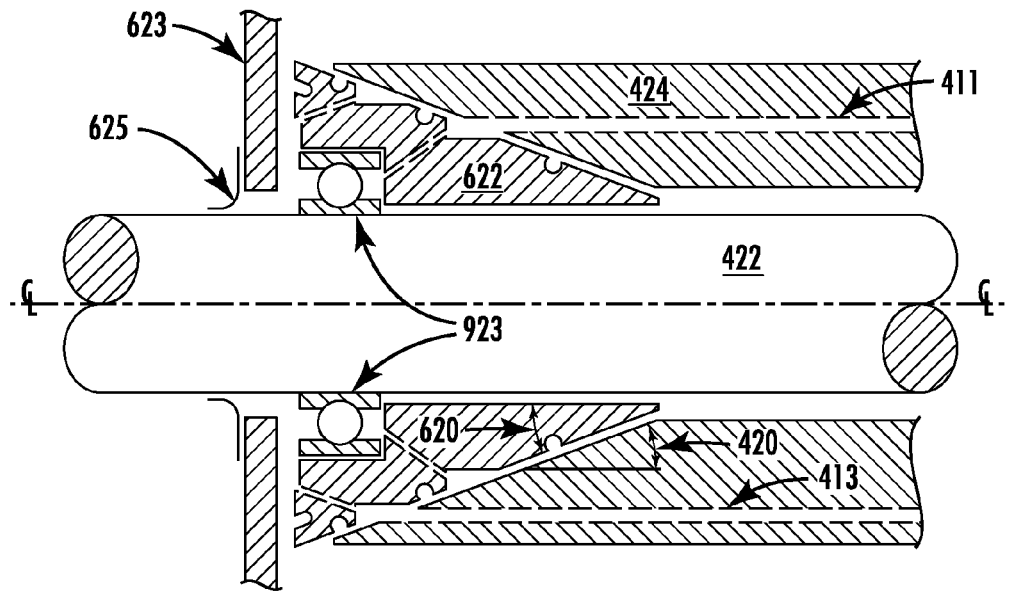
FIG. 35 is a view of a ball bearing held in bearing holder of FIG. 32.

FIG. 3 is similar to FIG. 1 but is more detailed to show adjacent parts of the boat propulsion system. FIG. 3 is not an exploded diagram, but is generally a longitudinal section view along the centerline of the drive shaft spline 423 shown on the right side and the propeller shaft spline 523 shown on the left side. Drive shaft spline 423 is held in radial position relative to the gimbal assembly by the use of journal bearings mounted in a cone shaped bearing holder 622 having an outside diameter 427 with a defined angle of taper, or taper angle 620 (FIG. 35). The bearing holder 622 is held into a mating tapered seat 425 of a drive shaft housing 424 (FIG. 32) by a bearing retainer plate 623 and by retainer bolts 626 and nuts 356. Shaft seal 625 is located outside of the bearing retainer plate by seal retainer plate 624 that is, in turn, clamped in position by bolts similar to retaining bolts 626. A first gimbal end 354 is integral with a first gimbal flange 384. The gimbal flange is typically circular and has bolt holes around the perimeter to accommodate bolting to the transom of the boat at Match Line DD. Other methods of fastening are contemplated. A second gimbal end 364 is likewise integral with a second gimbal flange 394. The first gimbal end and first gimbal flange are generally identical to the second end, but are rotated 90 degrees relative to each other. Shaft splines 423 or 523, bearing mounting and shaft sealing details of the drive shaft 422 and propeller shaft 522 within the gimbal assembly are very similar on either end. These details are shown and described in greater clarity in FIGS. 9-12. Alignment pins 311 are inserted temporarily into alignment pin holes 312 in first gimbal end 354 and second gimbal end 364 to keep the ends from flopping around when the gimbal assembly is being reassembled. Gimbal pin 345 has pull ring 347 and gimbal pin cross pin 348 that limits the insertion depth of the gimbal pin into the U bolt 355. Bellows 375 is clamped to bellows ring 374 with bellows clamp 376. Bellows ring has fill and drain holes 377 to flush and purge the enclosed space. Gimbal ends have access holes 366, inspection holes 365, and grease fittings 325 to pump sealant into the cracks between mating components.

Figure 4:
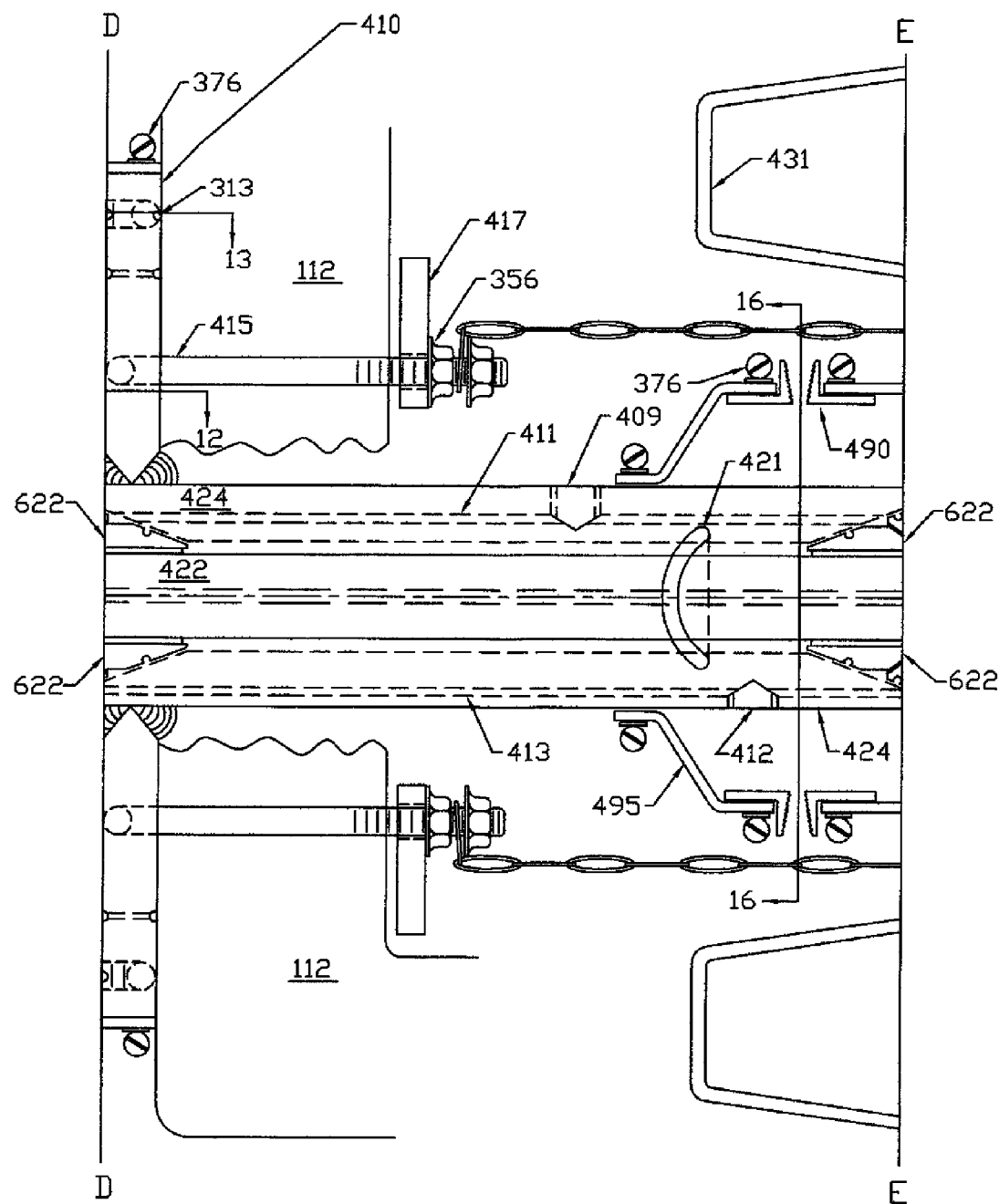
FIG. 4 is combination of an exploded view and a phantom view of the drive shaft housing located between Match Line D-D and Match Line E-E of FIG. 2.
Figure 5:
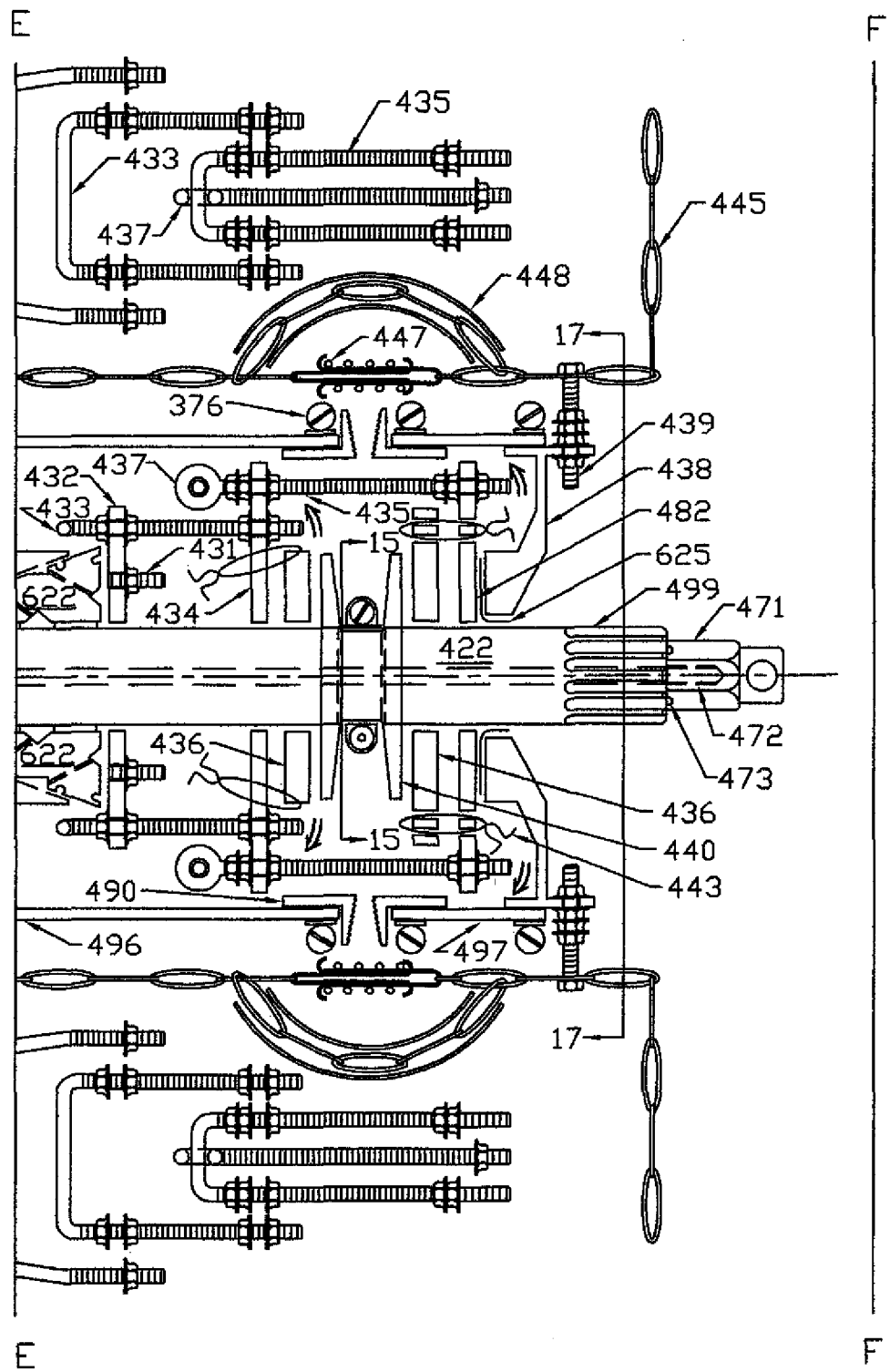
FIG. 5 is a combination of an exploded view and shows a portion of the drive shaft housing located between Match Line E-E and Match Line F-F of FIG. 2.

FIG. 4 is combination of an exploded view and a phantom view of the drive shaft housing 424 located between Match Line D-D and Match Line E-E of FIG. 2. This portion of the propulsions unit is located where the drive shaft penetrates the transom 112 of the boat. The drive shaft housing flange 410 is integral with the drive shaft housing 424. This is the portion of the propulsion system that pierces the transom 112 of the boat from the outside and is bolted in place by transom plate 417, transom bolts 415, and nuts 356. The drive shaft 422 is located inside the center bore of the drive shaft housing 424 and is carried on a journal bearing mounted inside bearing holder 622 located on either end of the drive shaft housing 424. Oil feed inlet 409 on the drive shaft housing provides a convenient point for introducing lubricating oil into an internally drilled longitudinal oil feed line 411. Pressurized oil feeds in both directions to lubricate the bearings on either end of the drive shaft. Oil is returned via a similar internally drilled oil drain line 413 and drains out of the drive shaft housing via oil drain outlet 412 into a contained area defined by rubber reduction sleeve 495 and oil drain ring 490 and secured with hose clamps 376 including other oil containment parts in the adjacent portion of the drive shaft housing as shown in FIG. 5. U bolts 431 are shown separate from the housing but actually go into the crescent cuts 421 and are used to hold the adjacent parts in place in the drive shaft housing. The bellows 375 of FIG. 3 are held in place with hose clamps 376.

FIG. 5 is a combination of an exploded view and shows a portion of the drive shaft housing located between Match Line E-E and Match Line F-F as noted in FIG. 2. This portion of the propulsion system is located where the drive shaft connects to the inboard style boat engine or motor not shown, but located to the right side of the drawing.

FIG. 5 shows a continuation of FIG. 4 between Match Lines E-E and Match Lines F-F and is shown as the input end of the drive shaft 422 where the drive shaft connects to the boat motor (not shown) via drive shaft input spline 499 on the right end of the drive shaft. The drive shaft is hollow and has a threaded rod 472 running down the center to the opposite end used to hold the Universal joint in place on the opposite end of the drive shaft. A drive shaft nut 471 with O-ring 473, is tightened to pull the Universal joint tight onto the drive shaft output spline 423 shown in FIG. 3. Section Line 17-17 refers to FIG. 17 where it is seen that the entire assembly is generally cylindrical. Chains 445 and screen door style spring 447 are tensioned and looped over and attach to bolts 439 to urge motor end seal retaining plate 438 to the left to secure shaft seal 625 against drive shaft forward thrust plate 482 to form a compression seal. Anti-rattle sleeves 448 are short pieces of loose fitting rubber hose slid onto the chain to prevent chain rattle. The shaft seal may be configured as a simple sheet of Teflon with a slightly undersized hole through the center to slip over the drive shaft. The Teflon seal is conformal and lends itself to quick and easy field repairs.

U bolts 433, 435, and eyebolt 437 are shown at the top and bottom of FIG. 5 to illustrate how these appear when properly installed adjacent to the drive shaft 422 in this figure. Bearing holder 622 is urged to the left by drive shaft forward bearing retainer plate 432 and held tight by U bolts 431 of FIG. 4. Bearing retainer plate 432 now provides an anchor point for U bolts 433 that is used to adjustably secure drive shaft rearward thrust plate 434 in correct axial position. U bolts 435 are secured to drive shaft rearward thrust plate 434 and bridge over the gap to a similar drive shaft forward thrust plate 482 discussed earlier. The drive shaft thrust bearing collar 440 is secured to the drive shaft and rides between a pair of drive shaft thrust bearing blocks 436 on either side of the thrust collar. Tie wires 443 hold thrust bearing blocks in place. The drive shaft thrust collar is detailed in FIG. 14 and in FIG. 15. This thrust bearing assembly can be designed as a light weight assembly because only the inertial mass of the drive shaft and the Universal joint are carried by this assembly and none of the propeller thrust is carried here.

Lubricating oil is contained by rubber sleeve 496 and rubber sleeve 497 that are both secured to drive shaft oil drain ring 490 by using hose clamps 476. The rubber sleeves are generally short pieces of large diameter hose.

Although other bolting and sealing methods may be used, it is desired to have a very field serviceable unit that can be repaired and adjusted using the simplest of hand tools and using captive bolts that swing aside after loosening the nuts, and U bolts to eliminate the need for a second wrench to hold the other end of the bolt, or to have blind or threaded holes in the drive shaft housing.

Figure 6:
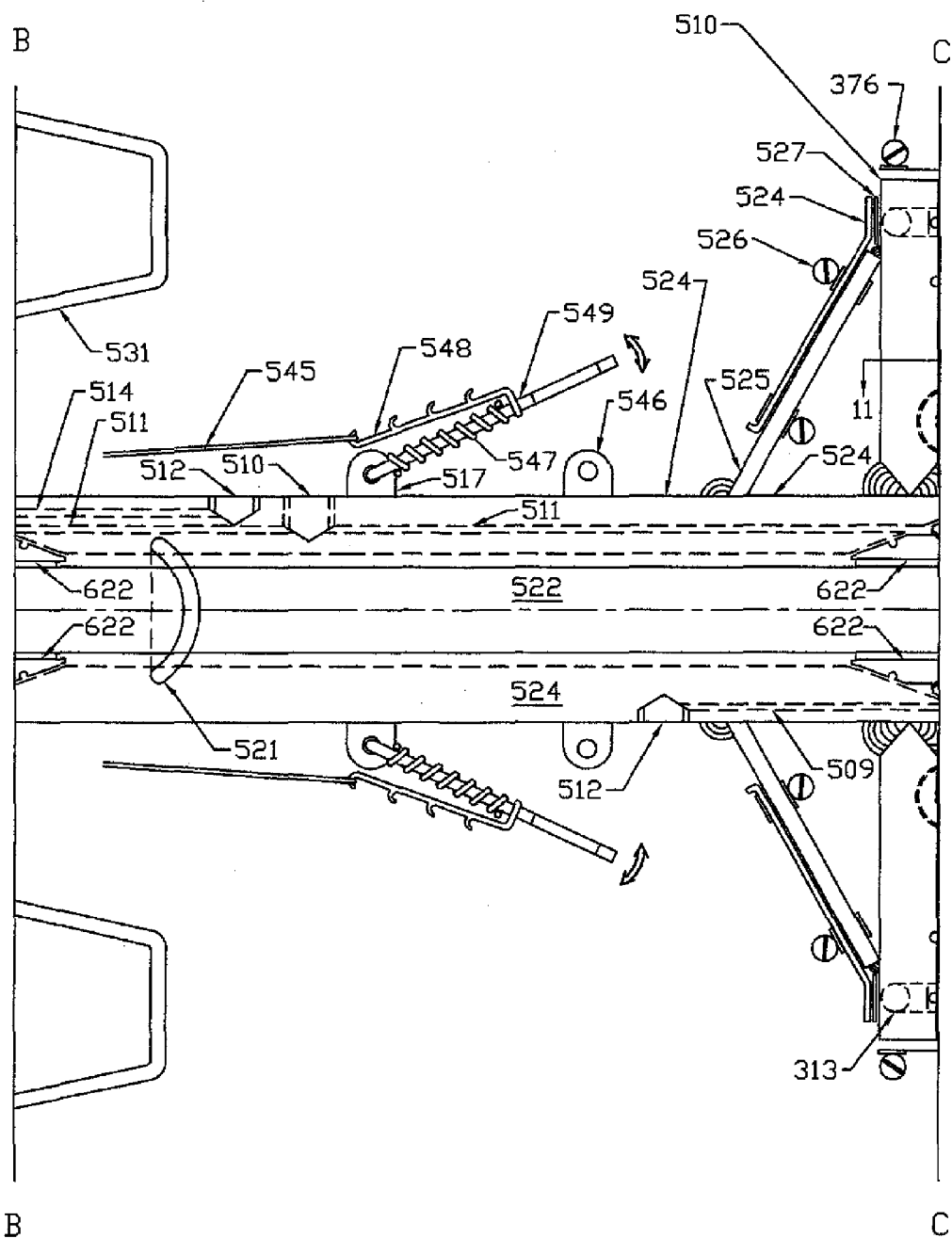
FIG. 6 is a combination of an exploded view and a phantom view of the propeller shaft housing and enclosed propeller shaft located between Match Line C-C and Match Line B-B of FIG. 2.

FIG. 6 is a combination of an exploded view and a phantom view of the propeller shaft housing 524 and enclosed propeller shaft 522 located between Match Line C-C and Match Line B-B of FIG. 2. FIG. 6 is a side view similar to the others and shows a propeller shaft housing 524 between Match Line B-B and Match Line C-C as seen in FIG. 2. This end is similar to the drive shaft end of the propulsion system in that the propeller shaft housing is generally cylindrical with a hollow center and a propeller shaft 522 running down through the center. The rotating propeller shaft is carried by a journal bearing in a bearing holder 622 on each end of the propeller shaft. Lubricant input hole 510 feeds cleaned and cooled oil to the bearings in the bearing holders. Oil is fed via oil feed tube 511. Oil drained out of the rearward bearing returns via the annular space between the propeller shaft and the propeller shaft housing and combines with oil in oil drain line 509 to ultimately exit via oil drain hole 512.

Figure 7:
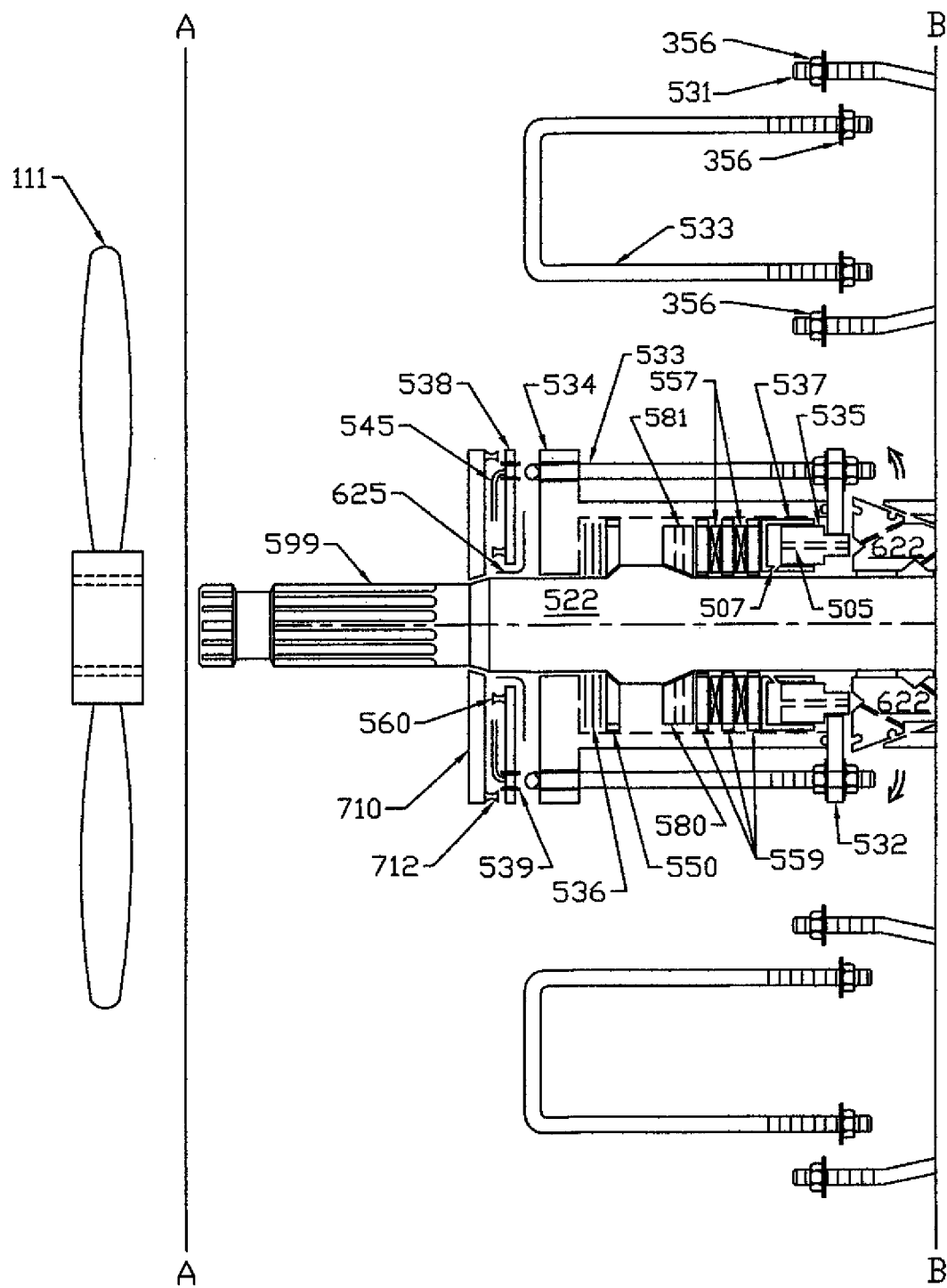
FIG. 7 is a combination of an exploded view and a phantom view of the thrust bearing can and enclosed propeller shaft located between Match Line B-B and Match Line A-A of FIG. 2.

Spring levers 549 with spring 547 and cable hook 548 exert a tension force on tension cable 545 to urge shaft seal 625 into place as shown on FIG. 7. Crescent cuts 521 provide a place to secure U bolts 531 to the propeller shaft housing in a fashion similar to that shown on the drive shaft end as shown in FIG. 4 and FIG. 5. Oil inlet hole 512 feeds oil via oil lines 514 to the thrust bearing assembly of FIG. 7. Propeller shaft housing flange 510 is integral to propeller shaft housing 524 and further stiffened by braces 525. U-bolt 313 are held in place by cover strips 524, sealed by patch seals 527, and all held in place by screw clamps 526.

FIG. 7 is a combination of an exploded view and a phantom view of the thrust bearing can 534 and enclosed propeller shaft 522 located between Match Line B-B and Match Line A-A as noted in FIG. 2. A propeller 111 is shown to the left of Match Line A-A. FIG. 7 is similar to FIG. 5 in that it has a shaft bearing in bearing holder 622, a thrust bearing assembly discussed below, and a shaft seal between the propeller shaft 522 and the thrust bearing containment can 534. The propeller 111 slides onto propeller shaft spline 599.

The thrust bearing assembly is much heavier on the propeller shaft than it is on the drive shaft because the entire thrust load from the propeller is carried in this assembly and is transferred to the propeller shaft housing 524 and ultimately through the gimbal assembly and to the boat hull at the transom. The thrust bearing assembly is comprised of an enlarged portion of the propeller shaft against which forward thrust collar 580 and rearward thrust collar 550 are abutted. The forward thrust collar 580 has impeller holes 581 drilled radially, plus others, to act as the impeller of a small oil pump to induce oil flow through the forward thrust bearing assembly located just to the right of the forward thrust collar. The forward thrust bearing assembly has a plurality of thrust bearing elements 557 located between a plurality of thrust bearing races 559. The thrust bearing elements may be anti friction rolling elements or may be low friction Teflon washers. The thrust bearing assembly also has an annular thrust cylinder 537 and annular thrust piston 535 shown in an enlarged view in FIG. 24. The annular thrust cylinder is circular in shape and forms an annular space between the inner wall and outer wall of the thrust cylinder. In other words, the thrust cylinder looks like a square sided "U" shape that is rotated about the centerline of the propeller shaft. The annular thrust piston is circular in shape similar to a fat and thick washer and fits into the circular groove of the annular thrust cylinder. The annular thrust piston has at least one oil feed passage 505 drilled through it from front to rear. This oil feed passage allows high pressure oil to flow from a source forward of the annular thrust piston to the pressurized chamber formed behind the annular thrust piston and within the annular thrust cylinder. There is at least one bleed port 507 located near the rear portion of the inside wall of the annular thrust cylinder wherein the bleed port allows excess oil to flow out of the confined space between the head of the annular thrust piston and the bottom of the annular thrust cylinder. The annular thrust cylinder rotates along with the propeller shaft. The annular thrust piston is stationary relative to the propeller shaft housing.

This annular thrust piston and annular thrust cylinder serve two purposes. The first purpose is to provide a hydrostatic oil cushion between a rotating part, e.g., the annular thrust cylinder, and a stationary part, e.g., the annular thrust piston. The roles of these two components can be reversed. Thus, the combination forms a very low friction thrust bearing assembly. The second purpose is to provide a thrust force measuring system that is based on the prevailing oil pressure within the confined space of the annular thrust cylinder and annular thrust piston. An oil pump with a high pressure discharge is located at some convenient location on the boat. Somewhere on the discharge line of the pump is a metering orifice. Downstream of the metering orifice is located an oil pressure gauge and an oil line routed back to feed the metered oil to the oil feed passage through the thrust piston. As the thrust force of the propeller pushes the propeller shaft and annular thrust cylinder forward, the bleed port in the annular thrust cylinder is progressively covered more and more by the forward motion and the oil pressure builds to a higher and higher value because the bleed port is progressively covered more and more. Thus, the oil pressure gauge reads a progressively higher pressure proportionate to the thrust force of the propeller on the boat. The converse operation, wherein the propeller generates less and less thrust, allows the annular thrust cylinder to move rearward relative to the annular thrust piston and tends to uncover the bleed port in the annular thrust cylinder wall, hence, the pressure on the oil pressure gauge is decreased proportionate to the decrease in the thrust force of the propeller on the boat. In this embodiment, metered oil is fed through a passage in bearing holder 622 and into the forward face of the annular thrust piston 535. Other means of oil feed can be used Annular thrust piston and annular thrust cylinder can be replaced with electronic load cells of similar annular shape, for example, "Large I.D. Through Hole Load Cell LC8213-200-5K" sold by Omega Engineering.

Rearward thrust collar 550 and rearward thrust bearings 536 push against thrust bearing containment can 534 when the propeller generates rearward thrust. Rear thrust bearings can be needle type or Teflon washers including shims for axial position adjustments.

Thrust bearing containment can 534 is in the shape of a cylinder with a full diameter hole at one end and an axial hole in the other end where the propeller shaft 522 exits. U bolts 533 and nuts 356 hold the thrust bearing containment can tight against bearing retainer plate 532. Bearing retainer plate is held in place against the propeller shaft housing by U bolts 531 and nuts 356.

Shaft seal 625 can be a sheet of Teflon with a tight fit over the propeller shaft 522 and is held tight against the rear face of the thrust bearing containment can 534 by means of rear propeller shaft seal holder plate 538 and is urged forward by tension cables 545 and cable hooks 548 shown in FIG. 6. Rear propeller shaft seal holder plate 538 has string cutters 560 with sharp edges to cut any fishing line wound around the propeller shaft. String cutters are also known as line cutters. Cable grommets 539 prevent chafing of tension cables 545 and preserve rotational alignment.

The propeller 111 is mounted to the propeller shaft in the ordinary way by use of propeller shaft splines 599. Forward motion of the propeller is limited by a propeller thrust washer 710 that has an internally tapered shoulder and fits on a complimentary tapered shoulder near the end of the propeller shaft 522. Propeller thrust washer 710 has rotating string cutters 712 with sharp edges to cut any fishing line wound around the propeller shaft. String cutters are also known as line cutters.

FIG. 8 is a simplified drawing of a conventional Universal joint 602 that couples a drive shaft 422 as shown on the right to a propeller shaft 522 as shown on the left. The universal joint is located within the confines of the gimbal assembly of FIG. 1 and FIG. 3. The illustrated Universal joint 602 is market available and typical of a double yoke Cardan style. These Universal joints are also referred to as "three piece Universal joints" comprising an input section 642, a center section 672, and an output section 652. Not shown, but common to all these Universal joints is a cross piece that is inserted into bearing holes 662 in each of the three sections. The Universal joint is located inside of the gimbal assembly of FIG. 1 and FIG. 3, but is not shown in those views to prevent clutter. The input section 642 is connected to drive shaft spline 423 and the output section 652 is connected to the propeller shaft spline 523 with a sliding fit. Universal joint center section 672 is located between the input section and the output section. The input section is secured to the drive shaft by a bolt 472 and washer 402 to prevent axial motion between the drive shaft and the input section. The drive shaft thrust bearing assembly of FIG. 5 is adjusted to correctly locate the Universal joint center section to be longitudinally centered within the gimbal assembly of FIG. 1 and FIG. 3. That is to say, the center plane of the Universal joint center section 672 is longitudinally centered at the same plane as the gimbal pins 345 of the gimbal assembly of FIG. 1 and FIG. 3. Slight longitudinal displacement can be tolerated, but it is not desirable.

Figure 9:
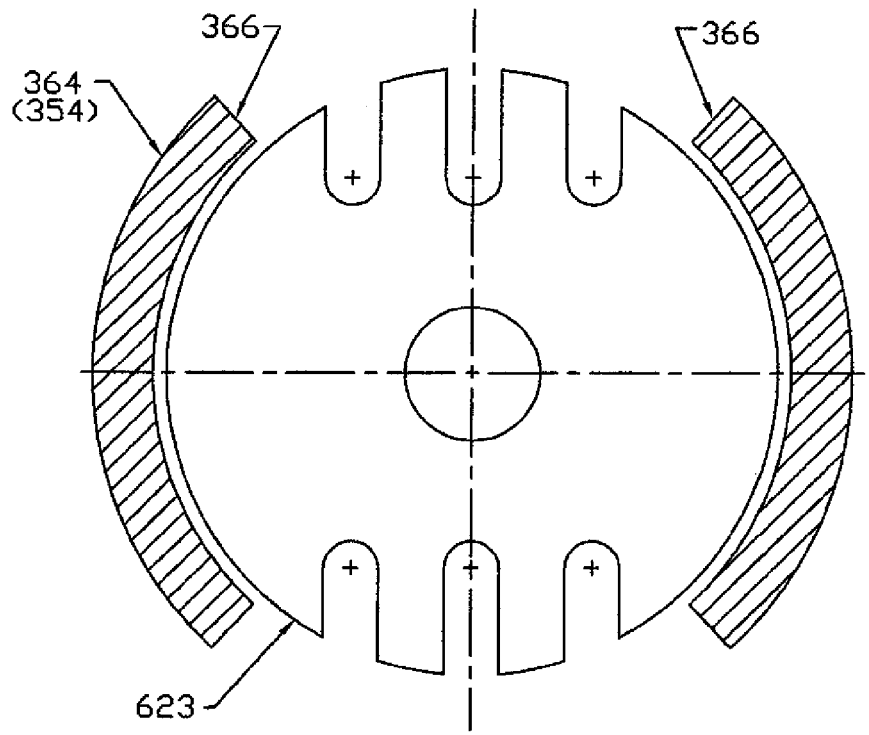
FIG. 9 is an end view of a bearing retainer plate located inside of the gimbal assembly and is used to secure a bearing holder in place inside of the shaft housing that protrudes into the gimbal end.

FIG. 9 is an end view of a bearing retainer plate 623 located inside of the gimbal assembly and is used to secure a bearing holder in place inside of the shaft housing that protrudes into the gimbal end. The bearing retainer plate 623 is viewed along Section Line 9-9 of FIG. 3. Second gimbal end 364, or alternately, first gimbal end 354, are shown as cross hatched and access holes 366 allow access to bolts and nuts inside. Slots at the top and bottom of the bearing retainer plate are for U bolts 626 shown in FIG. 11.

Figure 10:
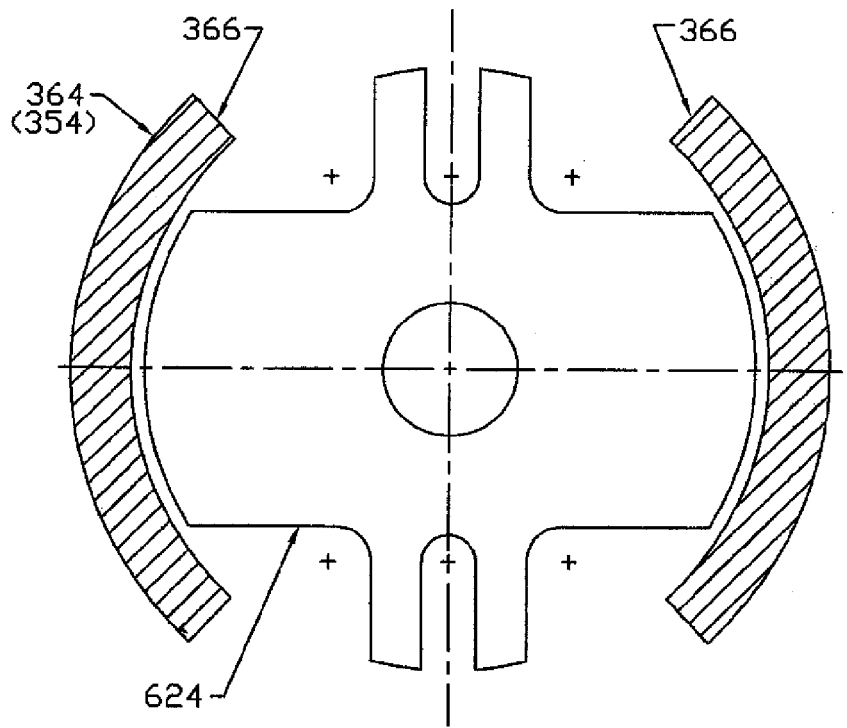
FIG. 10 is an end view of a seal retainer plate used inside of the gimbal assembly to secure a shaft seal in place.

FIG. 10 is an end view of seal retainer plate 624 as viewed along Section Line 10-10 of FIG. 3, in which the seal retainer plate used inside of the gimbal assembly to secure a shaft seal in place. Second gimbal end 364, or alternately, first gimbal end 354, are shown as cross hatched and access holes 366 allow access to bolts and nuts inside. Slots at the top and bottom of the seal retainer plate are for receiving swing bolts 627 shown in FIG. 11.

Figures 11, 12:
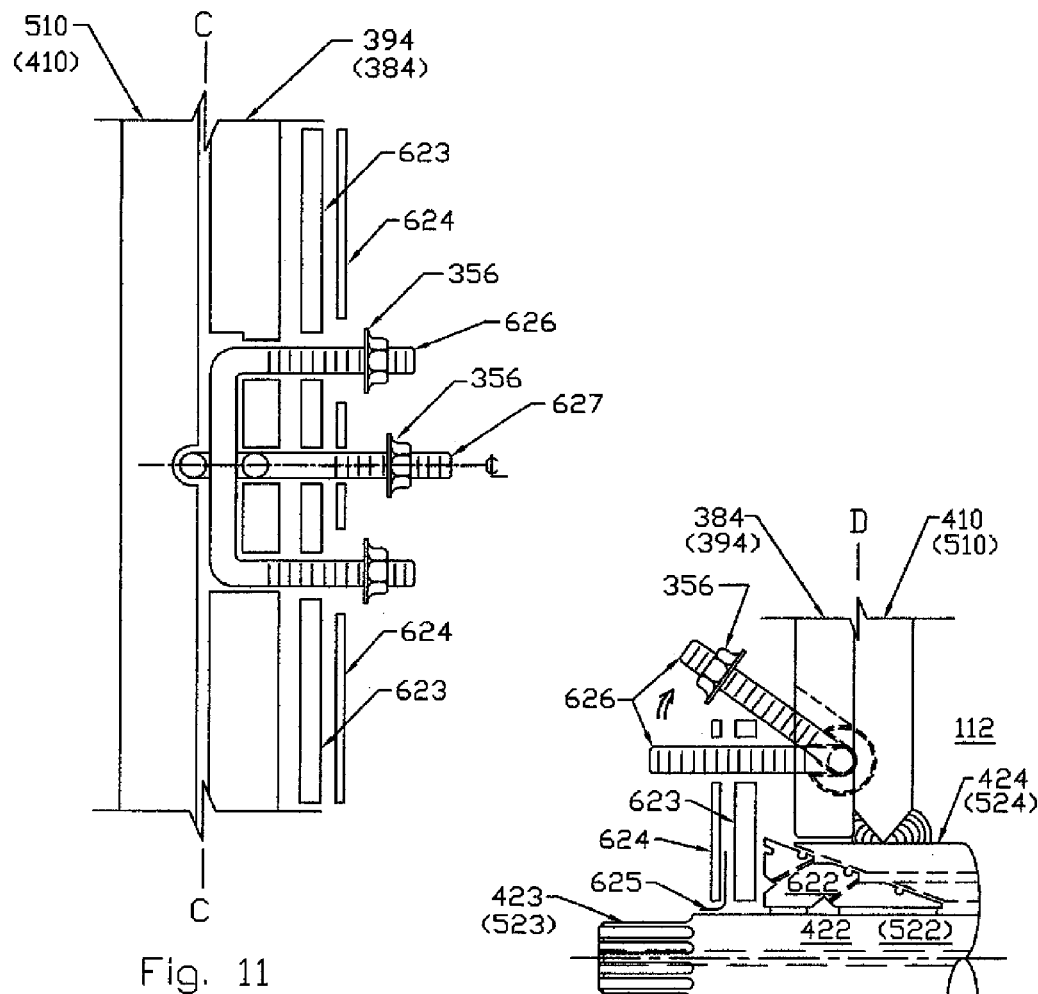
FIG. 11 is a side view of the bearing retainer plate of FIG. 9 and the seal retainer plate of FIG. 10 and includes the clamping bolts to retain the plates.
FIG. 12 is a side sectional view of FIG. 11 but rotated 90 degrees to show the relation of the drive shaft 422, or alternately, propeller shaft 522, and the bearing holder 622 and the shaft seal 625 and respective retaining plates. This view is a mirror image of FIG. 11 as it represents the similar items but as located on the other end of the gimbal assembly.

FIG. 11 is a side view of the bearing retainer plate of FIG. 9 and the seal retainer plate of FIG. 10 and includes the clamping bolts to retain the plates. FIG. 11 is a top view of an enlarged portion of FIG. 3 as viewed along Section Line 11-11. This view straddles Match Line C-C and shows how the U bolt 626 secures the bearing retainer plate 623 with nuts 356. Also shown is the seal retainer plate 624 held in place by swing bolt 627 and nut 356. The swing bolt is configured as an eye bolt fitted onto the square U bolt 626 and both are inserted into gimbal plate 394 or (384) before it is bolted to propeller shaft housing plate 510 or (drive shaft housing plate 410). This construction of using captive bolts allows both the U bolt and the swing bolt to be tightened or loosened with a single wrench and swung aside for removal of the respective retainer plates without loosing either the nuts or the bolts.

FIG. 12 is a side view of FIG. 11 and is taken along Section Line 12-12 of FIG. 3, but is rotated 90 degrees to show the relation of the drive shaft 422, or alternately, propeller shaft 522, and the bearing holder 622 and the shaft seal 625 and respective retaining plates. This view is a mirror image of FIG. 11 as it represents the similar items but as located on the other end of the gimbal assembly. This view shows how the bearing retainer plate 623 holds the bearing holder 622 into place in the drive shaft housing 424, or alternately in the propeller shaft housing 524. Shaft seal 625 is held by shaft seal retainer plate 624. Bearing retainer plate 623 is held in position by U bolts 626 and nuts 356 that can be loosened and swung away for removal of the bearing holder. Shaft seal retainer plate 624 is held in place by eye bolt 627 and nuts 356 that can be loosened and swung away for removal of the shaft seal 625.

Figure 13:
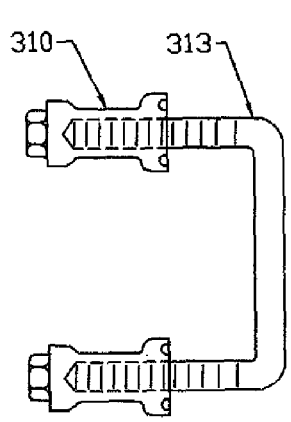
FIG. 13 shows a side view of a retaining bolt that holds the gimbal assembly to either the drive shaft housing to the propeller shaft housing.

FIG. 13 shows a side view of a retaining bolt 313 that holds the gimbal assembly to either the drive shaft housing, or alternatively, to the propeller shaft housing. FIG. 13 is a view of clamping U bolt 313 and nuts 310 that hold second gimbal flange 394, or alternately first gimbal flange 384, together against propeller shaft housing flange 510 or drive shaft housing flange 410 as seen in FIG. 3 and FIG. 6, or FIG. 3 and FIG. 4, respectively.

Figures 14, 15:
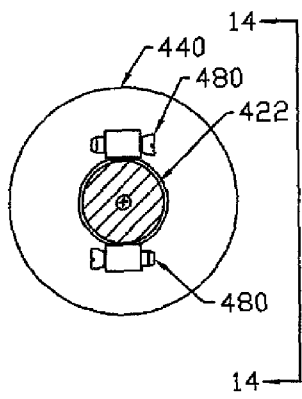
FIG. 14 shows a side view of the thrust collar that is connected to the drive shaft of FIG. 5.
FIG. 15 is an end view of the thrust collar of FIG. 14 as mounted on the drive shaft.

FIG. 14 is a side view of drive shaft thrust collar 440 mounted on drive shaft 422 as viewed in FIG. 5. Drive shaft thrust collar takes on the appearance of a V belt pulley with flat faces and has the small diameter of the pulley groove cut away at two locations to allow the buckle portion of a pair of collar clamps 480 to intrude into a groove cut into the drive shaft. Thus, the thrust collar is easily removed and replaced without any loose part by simply loosening the collar clamps to slide the drive shaft thrust collar off the end of the drive shaft. An ordinary hose clamp can be used as a collar clamp. However, a pair of hose clamps connected nose to tail to each other is better because it ensures symmetry such that rotating balance is preserved.

FIG. 15 is an end view of the thrust collar 440 as mounted on the drive shaft 422 of FIG. 14 taken along Section Line 15-15 and shows the detail of the buckle portion of the collar clamps 480 actually intruding into the groove in drive shaft 422.

Figure 16:
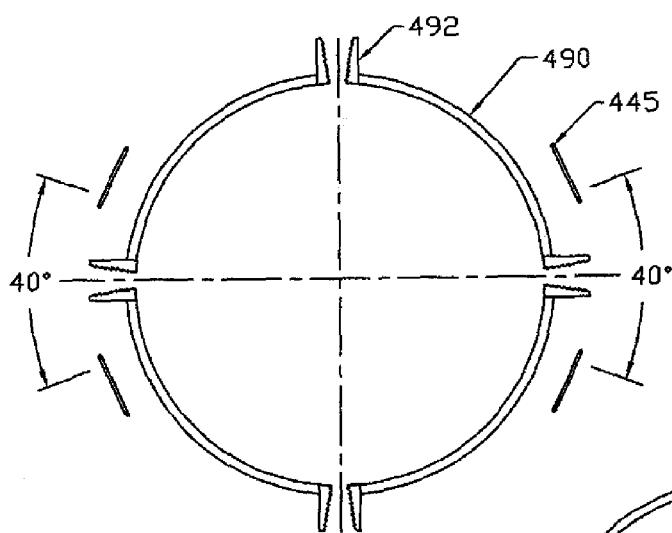
FIG. 16 is an end view of the oil drain ring of FIG. 5.

FIG. 16 is an end view of oil drain ring 490 as shown in Section Line 16-16 of FIG. 4 and similarly in FIG. 5. Oil drain ring is made of rigid material, usually metal, that has drain holes 492 for hose fitting to return oil to a reservoir not shown. Hose clamps 376 hold hose 496 and hose 497, as shown in FIG. 5, in place to prevent leakage.

Figure 17:
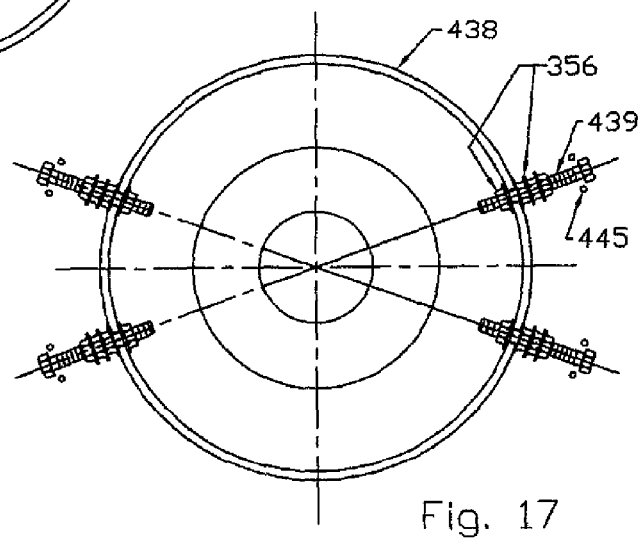
FIG. 17 is an end view of the drive shaft input seal retainer plate of FIG. 5.

FIG. 17 is an end view of drive shaft oil seal retainer ring 438 as viewed in Section Line 17-17 of FIG. 5. Bolts 439 are secured with nuts 356 and provide an attachment point for chain 445 used to tension drive shaft oil seal retainer plate against shaft seal 625 shown in FIG. 5.

Figure 18:
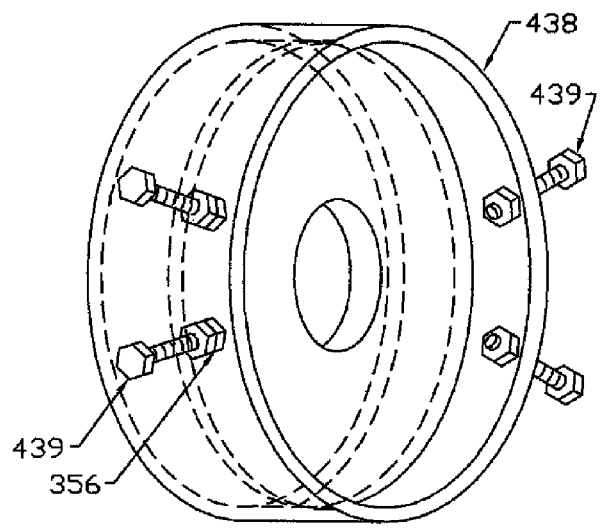
FIG. 18 is perspective view of the drive shaft input seal retainer plate of FIG. 17.

FIG. 18 is a perspective view of drive shaft oil seal retainer ring 438 shown in FIG. 17 and FIG. 5. Bolts 439, with nuts 356, provide an attachment point for chain.

Figure 19:
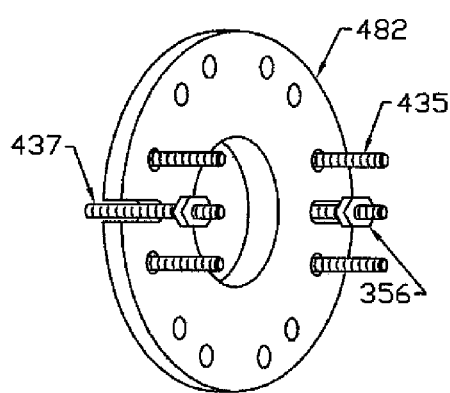
FIG. 19 is perspective view of the drive shaft forward thrust plate and bolts of FIG. 5.

FIG. 19 is a perspective view of drive shaft forward thrust plate 482 as shown in FIG. 5. Location for U bolts 435, eye bolts 437, and nuts 356 are shown.

Figure 20:
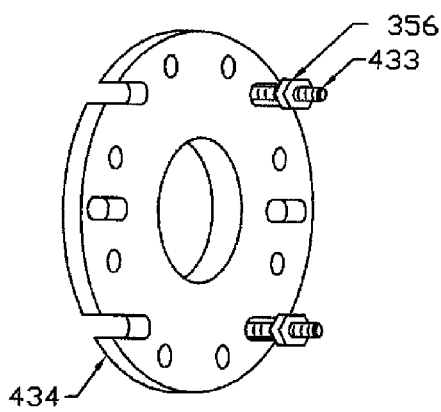
FIG. 20 is perspective view of the drive shaft rearward thrust plate and bolts of FIG. 5.

FIG. 20 is a perspective view of drive shaft rearward thrust bearing plate 434 as shown in FIG. 5. Locations for U bolts 433, and nuts 356, are shown.

Figure 21:
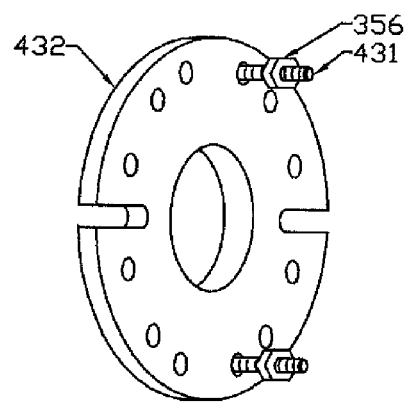
FIG. 21 is perspective view of the drive shaft forward bearing holder retainer plate and bolts of FIG. 5.

FIG. 21 is a perspective view of drive shaft forward end bearing retainer plate 432 as shown in FIG. 5. Locations for U bolts 431, and nuts 356, are shown.

Figures 22, 23:
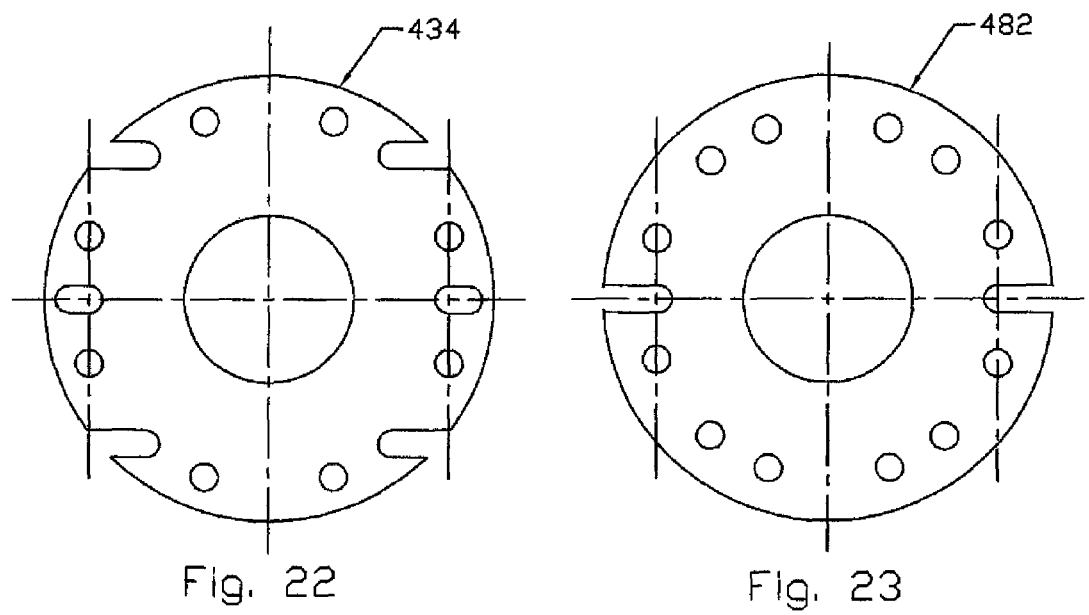
FIG. 22 is an end view of the drive shaft rearward thrust bearing plate of FIGS. 5 and 20.
FIG. 23 is an end view of the drive shaft forward thrust bearing plate and bolts of FIGS. 5 and 21.

FIG. 22 is an end view of drive shaft rearward thrust bearing plate 434 as shown in FIG. 5 and FIG. 20 but is shown to illustrate the approximate layout required for machining of the bolt holes and slots.

FIG. 23 is an end view of drive shaft forward bearing retainer plate 432 as shown in FIG. 5 and FIG. 21 but is shown to illustrate the approximate layout required for machining of the bolt holes and slots.

Figure 24:
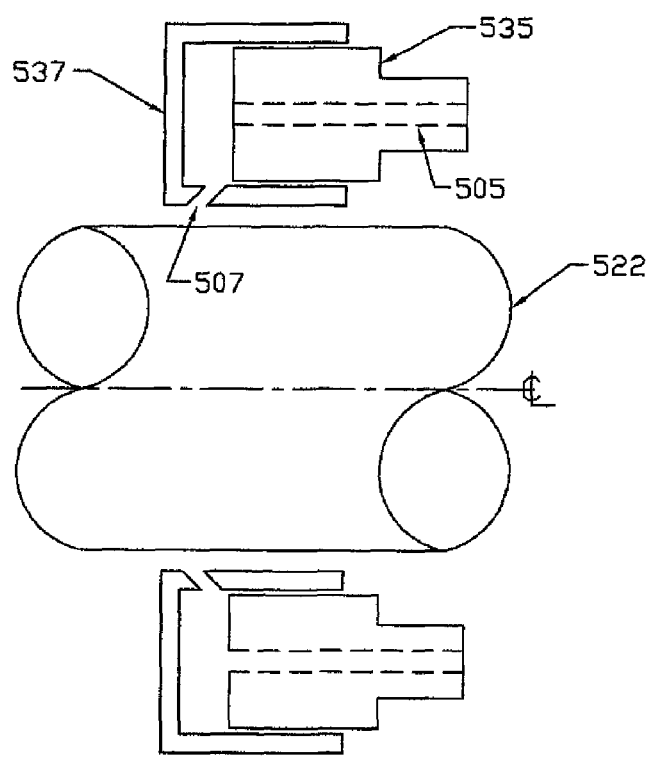
FIG. 24 is an enlarged sectional view of the propeller shaft annular thrust piston and propeller shaft annular thrust cylinder of FIG. 7.

FIG. 24 is an enlarged and detailed side sectional view of an annular thrust cylinder 537 and an annular thrust piston 535 as seen in FIG. 7 on propeller shaft 522. Details of the oil bleed port 507 through the annular thrust cylinder and oil feed passage 505 drilled through annular thrust piston are shown. This is configured as an annular piston that fits inside an annular cylinder that are filled from a high pressure oil source through the oil feed passages to cause the oil to push the annular cylinder towards the rearward position and away from the annular piston. Propeller thrust forces in the forward direction cause the annular cylinder to be pushed forward towards the annular piston. As the propeller thrust forward forces increase, the oil bleed port is progressively closed by the closing motion of the annular piston into the annular cylinder, thus raising the oil pressure as read by the remote gauge. Thus, the trapped oil causes the annular piston to assume an equilibrium position in the annular cylinder. As the propeller thrust decreases, the annular cylinder moves rearward by a small amount thus allowing more of the trapped oil to flow out of the oil bleed port and the system comes to a new equilibrium position. The pressure of the oil trapped in the cylinder is proportional to the forward thrust force of the propeller. This pressure is read by a remote gauge located at the drivers convenience to monitor the propeller thrust. This combination of an annular cylinder and an annular piston also serve as a hydraulic bearing that is a hydrostatic bearing. This is different from a hydrodynamic bearing such as a Kingsbury thrust bearing or a journal sleeve bearing which operate by a skiing action of a moving shaft against a stationary bearing causing the oil to be swept into a thin wedge shaped film of oil separating the two mating machine parts. One of the embodiments of this invention is the oil filled annular cylinder with an annular piston that serve either as a hydraulic thrust bearing, or as a hydraulic thrust force sensor.

Figure 25:
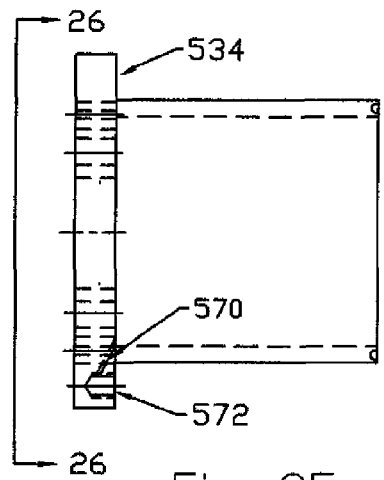
FIG. 25 is a side view of the thrust bearing containment can of FIG. 7.

FIG. 25 is a side view of thrust bearing containment can 534 as shown in FIG. 7. This figure also shows details of an oil return hole 570 as drilled diagonally into a threaded hole 572 for an oil drain fitting that is piped back to an oil reservoir on the boat.

Figure 26:
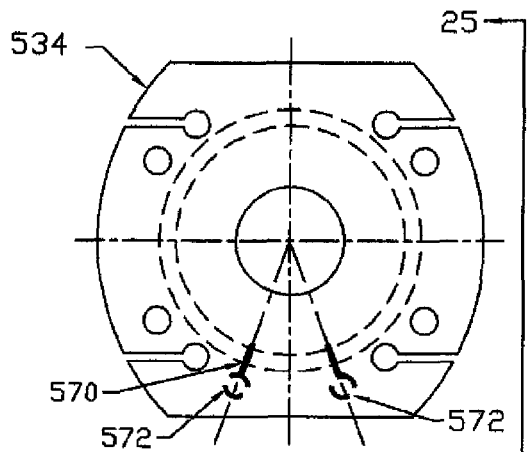
FIG. 26 is an end view of the thrust bearing containment can of FIG. 25.

FIG. 26 is an end view of thrust bearing containment can 534 as shown in FIG. 25 as viewed along Section Line 26-26. Various holes are shown for U bolts 533 and tension cables 545 shown in FIG. 31. Oil return hole 570 and threaded hole 572 of FIG. 25 are shown.

Figure 27:
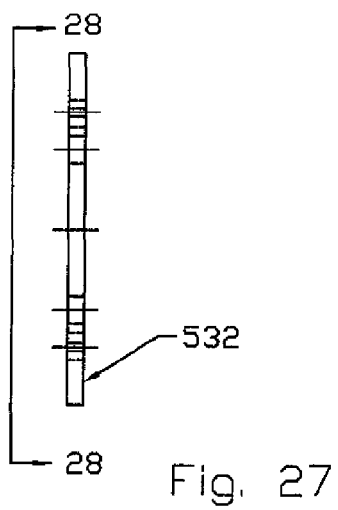
FIG. 27 is a side view of propeller shaft rear bearing holder retainer plate of FIG. 7.

FIG. 27 is a side view of propeller shaft rear bearing retainer plate 532 as shown in FIG. 7.

Figure 28:
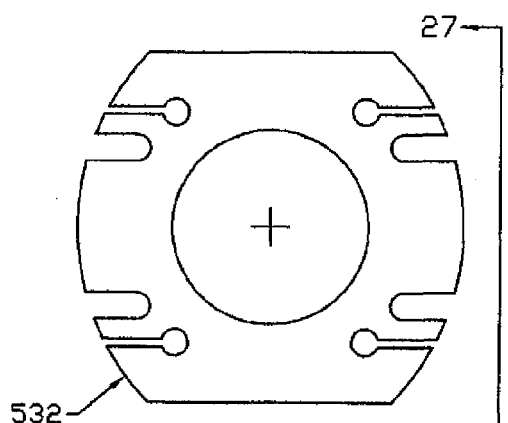
FIG. 28 is an end view of propeller shaft rear bearing holder retainer plate of FIG. 27.

FIG. 28 is an end view of propeller shaft rear bearing retainer plate 532 as shown in FIG. 27 as viewed along Section Line 28-28. Holes for bolts and slots for cables are shown for machining layout.

Figure 29:
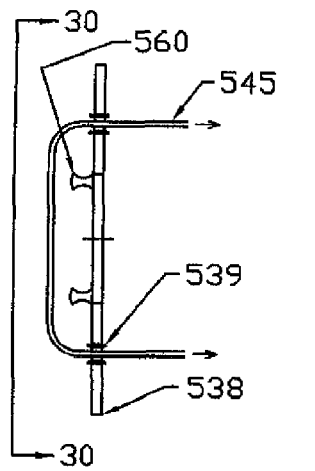
FIG. 29 is a side view of propeller shaft rear seal retaining plate of FIG. 7.

FIG. 29 is a side view of propeller shaft seal retainer plate 538 as shown in FIG. 7. Tension cable 545 is shown passing through cable grommets 539 and includes sharp edged string cutters 560. String cutters are also called line cutters.

Figure 30:
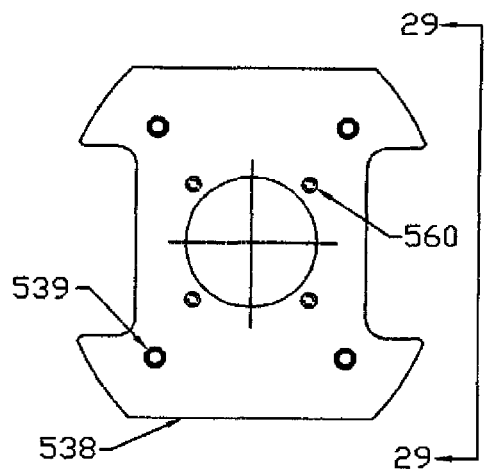
FIG. 30 is an end view of propeller shaft rear seal retaining plate of FIG. 29.

FIG. 30 is an end view of propeller shaft seal retainer plate 538 as shown in Section Line 30-30 in FIG. 29. Cable grommets 539 and sharp edged string cutters 560 are also shown. String cutters are also called line cutters.

Figure 31:
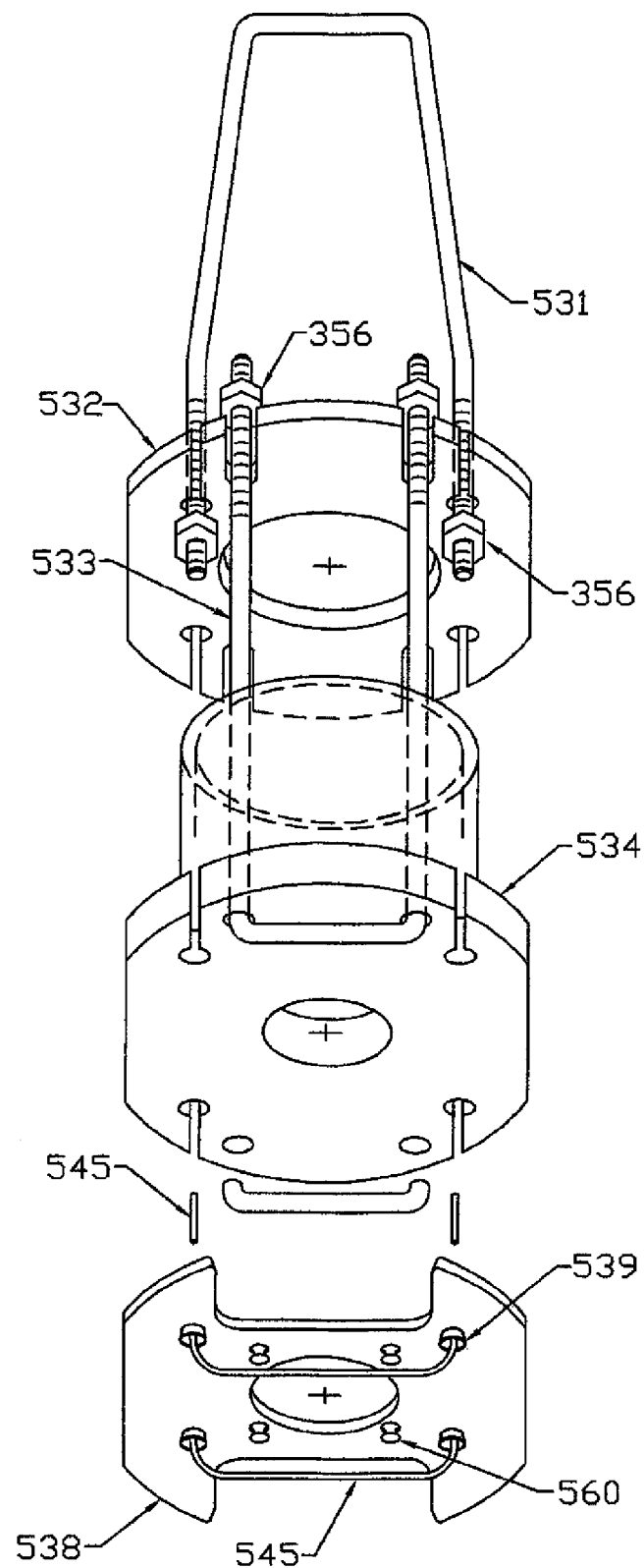
FIG. 31 is an exploded assembly drawing shown as a perspective view of the bearing housing and seal parts at the rearward end of the propeller shaft as shown in FIGS. 25-30 that are part of the bearing housing and seal of FIG. 7.

FIG. 31 is a perspective of an exploded view of the propeller shaft thrust containment can 534 including U bolts 531, and U bolts 533, and nuts 356 that holds the propeller shaft thrust containment can against propeller shaft bearing retainer plate 532 which is in turn held against bearing holder 622 forced into the propeller shaft housing 524, both shown in FIG. 7 by U bolts 531. Also shown is propeller shaft seal retainer plate 538 with string cutters 560 and cable grommets 539 that hold it in place around the propeller shaft by means of tension cables 545. All of which can be seen in FIG. 7.

Figure 32:
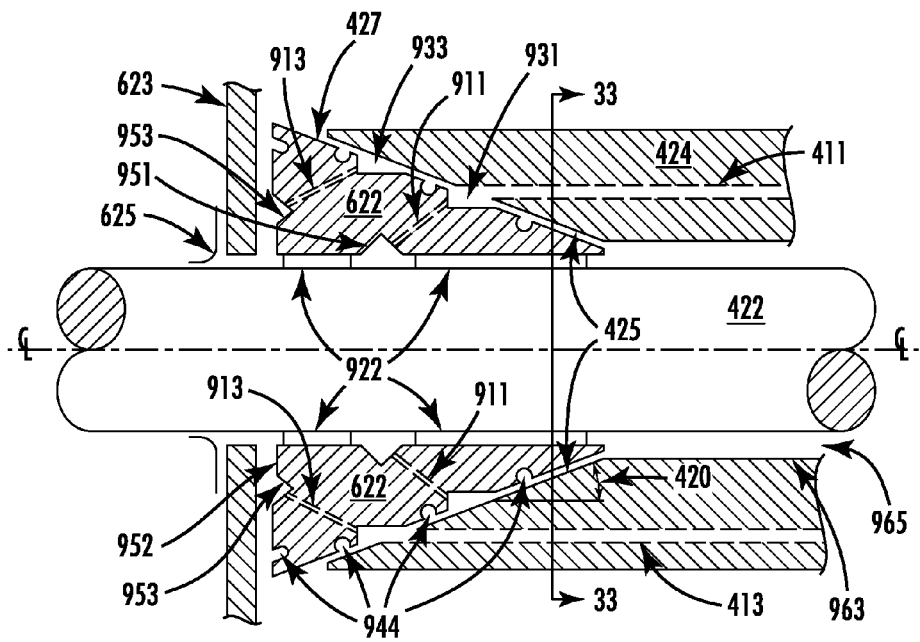
FIG. 32 is an enlarged sectional view of the bearing holder in relation to the drive shaft and the drive shaft housing of FIG. 4.

FIG. 32 is a side sectional view of bearing holder 622 as seen in FIG. 3 near Match Line D-D. Drive shaft housing 424 has the tapered seat 425 to receive the tapered outside diameter 427 of the bearing holder, the tapered seat in non-deformable 622. Oil supply drilled hole 411, shown in FIG. 4, supplies pressurized oil from a remote oil reservoir not shown. Oil return drilled hole 413 provides a drain path away from the bearing as seen in FIG. 4. Oil supply drilled hole communicates with a first circumferential groove 931 that allows the bearing holder to be inserted in any angular orientation and still ensure that oil will feed into bearing holder oil feed passages 911 into an internal annular groove 951 to feed lubricating oil into sleeve bearings 922. Similarly, oil return drilled hole 413 aligns with a second circumferential groove 933 that allows the lubricating oil that seeps out of the end of the sleeve bearings to slide down into face groove 953 and pass through drilled drain holes 913 and to oil return drilled hole 413 to ultimately return to a reservoir located on the boat. Bearing holder 622 has a recessed face area 952 to allow clearance for the return oil to flow radially from the drive shaft outward to annular face groove 953. As stated before, bearing retainer plate 623 urges bearing holder 622 into the mating tapered seat 425 of the drive shaft housing 424. The location of the shaft seal 625 is shown. Circumferential O-ring grooves 944 are located on the tapered outside diameter 427 and on the end face of the bearing holder 622. Drive shaft housing has an inside bore diameter 963 greater than the diameter of the shaft 422 with sufficient clearance for a drain path 965 for excess oil. The inside diameter of the bearing 922 is the point where the shaft is in contact with the bearing. The slope of a taper angle 420 of the drive shaft housing 424 is greater than the critical self-ejecting taper angle as determined from machinery design handbooks. Taper angle 420 is a self ejecting taper such that the tangent of the taper angle is greater than the coefficient of friction between the two mating materials. The outside diameter 427 of the bearing holder 622 has taper angle 620 that is generally equal to the mating taper angle 420 of the taper seat 425 (FIG. 35) of the drive shaft housing 424. The same is true for the propeller shaft housing 524.

Figure 33:
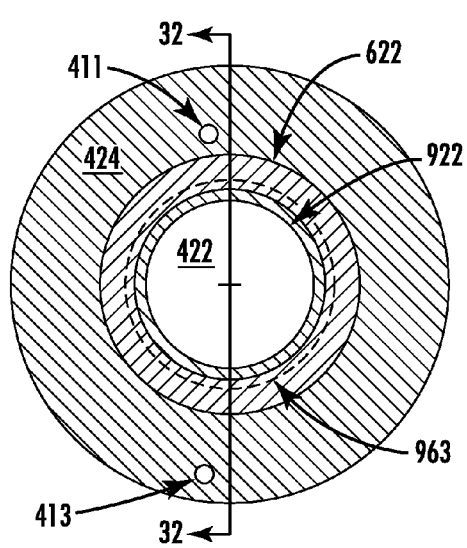
FIG. 33 is an end sectional view of the bearing holder and drive shaft housing as taken along Section Line 33-33 of FIG. 32.

FIG. 33 is an end view of FIG. 32 as taken along Section Line 33-33. Oil supply drilled hole 411 and oil return drilled hole 413 are shown in drive shaft housing 424. Sleeve bearing 922 supports drive shaft 422. The inside of the drive shaft housing 424 has an inside bore diameter 963 greater than the drive shaft 422. The inside diameter of the shaft bearing 922 is the point where the shaft is in contact with the bearing.

Figure 34:
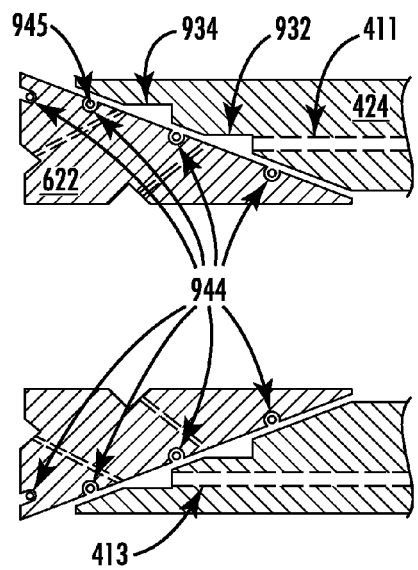
FIG. 34 is another view of FIG. 32 of a bearing holder fitted into a drive shaft housing including O-ring grooves and O-rings.

FIG. 34 is a side sectional view of bearing holder 622 similar to FIG. 32. Alternate embodiments of the oil supply channels and oil drain channels include circumferential supply grooves 932 and circumferential drain grooves 934 to be cut into the drive shaft housing 424. Other features of bearing holder 622 remain the same. Resilient O-rings 945 are placed in the circumferential O-ring grooves 944.

FIG. 35 shows an alternate style of bearings common in the industry thus mounted in bearing holder 622. Ball bearing 923 is held in place by the bearing retainer plate 623. The inner race is commonly secured to the rotating drive shaft 422 by set screws or press fit as common in machine practice. Mounting and retaining these bearings is common knowledge. Other features of the bearing holder and shaft housing are the same as FIG. 32. Taper angle 620 of the bearing holder 622 is equal to the taper angle 420 of the drive shaft housing 424.

Figure 36:
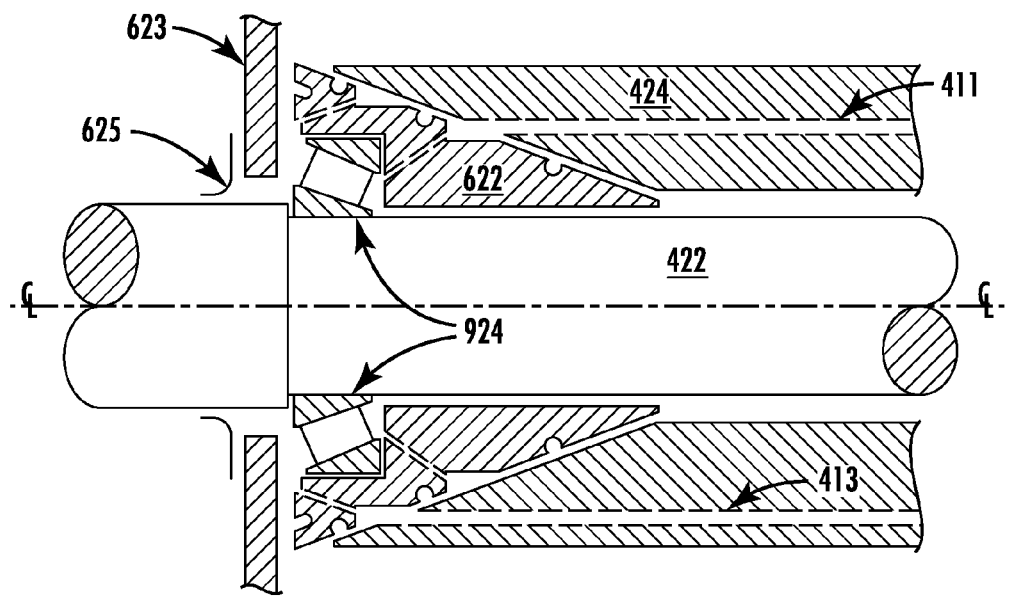
FIG. 36 is a view of a tapered roller bearing held in bearing holder of FIG. 32.

FIG. 36 shows an alternate style of bearings common in the industry thus mounted in bearing holder 622. Tapered roller bearing 924 is held in place by the bearing retainer plate 623. The inner race is commonly secured to the rotating drive shaft 422 by set screws or press fit as common in machine practice. Mounting and retaining these bearings is common knowledge. Other features of the bearing holder and shaft housing are the same as FIG. 32.

All of the above described features in FIG. 32, FIG. 33, FIG. 34, FIG. 35, and FIG. 36 also apply to the bearing holder of the propeller shaft housing 524. Although the tapered section is generated from a single geometric cone, it is contemplated to use multiple geometric cones to accommodate other design constraints. The single geometric cone is usually sufficient and is the easiest to manufacture.

FIG. 37 is a view of FIG. 1, but shows what the cylindrically shaped gimbal assembly would look like if it was cut open and laid out flat on a sheet of paper. This view emphasizes the zigzag nature of the gimbal ring 344 showing how the gimbal pins 345 are mounted to the face of the gimbal ring by use of U bolts 355 and nuts 356. Gimbal pins form a common flat plane transverse to the axis of the gimbal assembly. This is a face loaded gimbal ring. Although it is possible to axially offset one pair of gimbal pins relative to the other pair of gimbal pins, there is no real advantage and it is poor machine design practice because it will cause improper operation of the Universal joint contained within the gimbal assembly similar to that caused by improper axial alignment. Improper axial alignment causes excessive vibration and wear. The gimbal ring 344 has a first ring edge 396 facing towards a first gimbal end 354. The gimbal ring has a second ring edge 397 facing towards a second gimbal end 364. Both the first ring edge and the second ring edge are generally parallel to each other and have a zigzag shape that is undulated from one gimbal pin 345 to the next gimbal pin. However, the gimbal pins are arranged to form a single transverse plane across the gimbal ring. The first gimbal end 354 has a pair of first end gimbal yokes 398 that are longitudinal extensions of the cylindrical form of the first gimbal end. These gimbal yokes have holes located on opposite sides of the cylindrical form to receive gimbal pins 345. The second gimbal end 364 has a pair of second end gimbal yokes 399 that are longitudinal extensions of the cylindrical form of the second gimbal end. These gimbal yokes have holes located on opposite sides of the cylindrical form to receive gimbal pins 345. In this layout, gimbal ring 344 appears longer than first gimbal end 354 or second gimbal end 364. That is to be expected because the gimbal ring has a larger diameter, hence a larger circumference, than first gimbal end or second gimbal end. The gimbal pins are separable from the gimbal yokes.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A quick change bearing holder apparatus for a rotating shaft, comprising:
a shaft housing for the rotating shaft, wherein said shaft housing has a tapered seat with a taper angle, and wherein said tapered seat is non-deformable;
a cone shaped bearing holder with an outer diameter having a taper angle that is equal to said taper angle of said tapered seat of said shaft housing; and
a bearing retainer that mounts to said shaft housing to urge said outer diameter of said bearing holder into mating position with said tapered seat of said shaft housing.

2. The quick change bearing holder apparatus of claim 1, wherein:
said shaft housing further comprises at least one lubrication feed line in said tapered seat; and
wherein said bearing holder further comprises at least one feed passage along said outer diameter in communication with said lubrication feed line of said shaft housing.

3. The quick change bearing holder apparatus of claim 2, wherein said tapered seat of said shaft housing further comprises at least one circumferential groove aligned with said lubrication feed line of said tapered seat and aligned with said at least one feed passage of said bearing holder.

4. The quick change bearing holder apparatus of claim 2, wherein said outer diameter of said bearing holder comprises a circumferential groove aligned with said lubrication feed line of said tapered seat and aligned with said at least one feed passage of said bearing holder.

5. The quick change bearing holder apparatus of claim 4, wherein said bearing holder has a plurality of feed passages aligned with said circumferential groove.

6. The quick change bearing holder apparatus of claim 2, wherein said bearing holder comprises a plurality of circumferential grooves.

7. The quick change bearing holder apparatus of claim 1, wherein:
said shaft housing further comprises at least one lubrication drain line in said tapered seat; and
wherein said bearing holder further comprises at least one drain hole along said outer diameter in communication with said drain line of said shaft housing.

8. The quick change bearing holder apparatus of claim 7, wherein said tapered seat of said shaft housing further comprises at least one circumferential groove aligned with said drain line of said tapered seat and aligned with said at least one drain hole of said bearing holder.

9. The quick change bearing holder apparatus of claim 7, wherein said outer diameter of said bearing holder comprises a circumferential groove aligned with said drain line of said tapered seat and aligned with said at least one drain hole of said bearing holder.

10. The quick change bearing holder apparatus of claim 9, wherein said bearing holder has a plurality of drain holes aligned with said circumferential groove.

11. The quick change bearing holder apparatus of claim 1, wherein said bearing holder further comprises at least one circumferential O-ring groove.

12. A quick change bearing holder apparatus for a rotating shaft, comprising:
a shaft housing for a rotating shaft, wherein said shaft housing has a tapered seat with a taper angle;
a cone shaped bearing holder with an outer diameter having a taper angle that is equal to said taper angle of said tapered seat of said shaft housing wherein said taper angle of said bearing holder and said taper angle of said shaft housing collectively comprise a self ejecting taper; and a bearing retainer for mounting to said shaft housing to urge said outer diameter of said bearing holder into mating position with said tapered hole of said shaft housing.

13. The quick change bearing holder apparatus of claim 12, wherein:
   said shaft housing further comprises at least one lubrication feed line in said tapered seat; and
   wherein said bearing holder further comprises at least one feed passage along said outer diameter in communication with said lubrication feed line of said shaft housing.

14. The quick change bearing holder apparatus of claim 13, wherein said tapered seat of said shaft housing further comprises at least one circumferential groove aligned with said lubrication feed line of said tapered seat and aligned with said at least one feed passage of said bearing holder.

15. The quick change bearing holder apparatus of claim 13, wherein said outer diameter of said bearing holder comprises a circumferential groove aligned with said lubrication feed line of said tapered seat and aligned with said at least one feed passage of said bearing holder.

16. The quick change bearing holder apparatus of claim 15, wherein said bearing holder has a plurality of feed passages aligned with said circumferential groove.

17. The quick change bearing holder apparatus of claim 13, wherein said bearing holder comprises a plurality of circumferential grooves.

18. The quick change bearing holder apparatus of claim 12, wherein:
   said shaft housing further comprises at least one drain line in said tapered seat; and
   wherein said bearing holder further comprises at least one drain hole along said outer diameter in communication with said drain line of said shaft housing.

19. The quick change bearing holder apparatus of claim 18, wherein said tapered seat of said shaft housing further comprises at least one circumferential groove aligned with said drain line of said tapered seat and aligned with said at least one drain hole of said bearing holder.

20. The quick change bearing holder apparatus of claim 18, wherein said outer diameter of said bearing holder comprises a circumferential groove aligned with said drain line of said tapered seat and aligned with said at least one drain hole of said bearing holder.

21. The quick change bearing holder apparatus of claim 20, wherein said bearing holder has a plurality of drain holes aligned with said circumferential groove.

22. The quick change bearing holder apparatus of claim 12, wherein said bearing holder further comprises at least one circumferential O-ring groove.

* * * * *